(12) United States Patent
Kitanovski et al.

(10) Patent No.: US 12,000,663 B2
(45) Date of Patent: Jun. 4, 2024

(54) METHOD FOR HEAT TRANSFER IN THE EMBEDDED STRUCTURE OF A HEAT REGENERATOR AND THE DESIGN THEREOF

(71) Applicant: GORENJE GOSPODINJSKI APARATI, D.D., Velenje (SI)

(72) Inventors: Andrej Kitanovski, Ljubljana (SI); Urban Tomc, Ljubljana-Dobrunje (SI); Katja Klinar, Zg. Gorje (SI); Joško Valentincic, Ljubljana (SI); Franc Majdic, Moravce (SI); Izidor Sabotin, Ljubljana (SI); Jure Mencinger, Ljubljana (SI)

(73) Assignee: GORENJE GOSPODINJSKI APARATI, D.D., Velenje (SI)

( * ) Notice: Subject to any disclaimer, the term of this patent is extended or adjusted under 35 U.S.C. 154(b) by 591 days.

(21) Appl. No.: 17/273,099

(22) PCT Filed: Sep. 2, 2019

(86) PCT No.: PCT/SI2019/050018
§ 371 (c)(1),
(2) Date: Mar. 3, 2021

(87) PCT Pub. No.: WO2020/050780
PCT Pub. Date: Mar. 12, 2020

(65) Prior Publication Data
US 2021/0341232 A1 Nov. 4, 2021

(30) Foreign Application Priority Data
Sep. 4, 2018 (SI) .................................. P-201800199

(51) Int. Cl.
*F28F 13/00* (2006.01)
*F02G 5/00* (2006.01)
(Continued)

(52) U.S. Cl.
CPC .............. *F28F 13/003* (2013.01); *F02G 5/00* (2013.01); *F25B 9/145* (2013.01); *F25B 17/00* (2013.01);
(Continued)

(58) Field of Classification Search
CPC .......... F25B 9/145; F25B 17/00; F25B 21/00; F25B 2309/1415; F25B 2309/003;
(Continued)

(56) References Cited

U.S. PATENT DOCUMENTS 6,467,274 B2 * 10/2002 Barclay ................. F25J 1/0225
62/607
2018/0238266 A1 * 8/2018 De Blok ................. F02G 1/057

* cited by examiner

*Primary Examiner* — Lionel Nouketcha
(74) *Attorney, Agent, or Firm* — Maschoff Brennan

(57) ABSTRACT

Heat regenerators and related methods enable heat transfer in an embedded structure of a heat regenerator. The heat regenerators enable a reduction of the pressure drop due to fluid flow through the heat regenerator and consequently an increase of power density. A heat regenerator includes a housing having a primary hot heat exchanger and a primary cold heat exchanger between elements for the oscillation of a primary fluid. The secondary fluid unidirectionally flows from the heat sink into the primary cold heat exchanger. The secondary fluid exits from the primary cold heat exchanger and unidirectionally flows towards the heat source. The secondary fluid S enters the primary hot heat exchanger and exits as the unidirectional flow of the secondary fluid S of the primary hot heat exchanger towards the heat sink. Between both primary heat exchangers, the porous regenerative material is positioned as part of the regenerator.

17 Claims, 24 Drawing Sheets

(51) Int. Cl.
*F25B 9/14* (2006.01)
*F25B 17/00* (2006.01)
*F25B 21/00* (2006.01)
*F28F 13/10* (2006.01)
*F28F 13/16* (2006.01)

(52) U.S. Cl.
CPC .............. *F25B 21/00* (2013.01); *F28F 13/10* (2013.01); *F28F 13/16* (2013.01); *F02G 2257/00* (2013.01); *F25B 2309/003* (2013.01); *F25B 2309/1415* (2013.01); *F25B 2321/001* (2013.01); *F25B 2321/002* (2013.01)

(58) Field of Classification Search
CPC .......... F25B 2321/001; F25B 2321/002; F02G 2257/00; F02G 2243/54; F28F 13/003; F28D 17/02
See application file for complete search history.

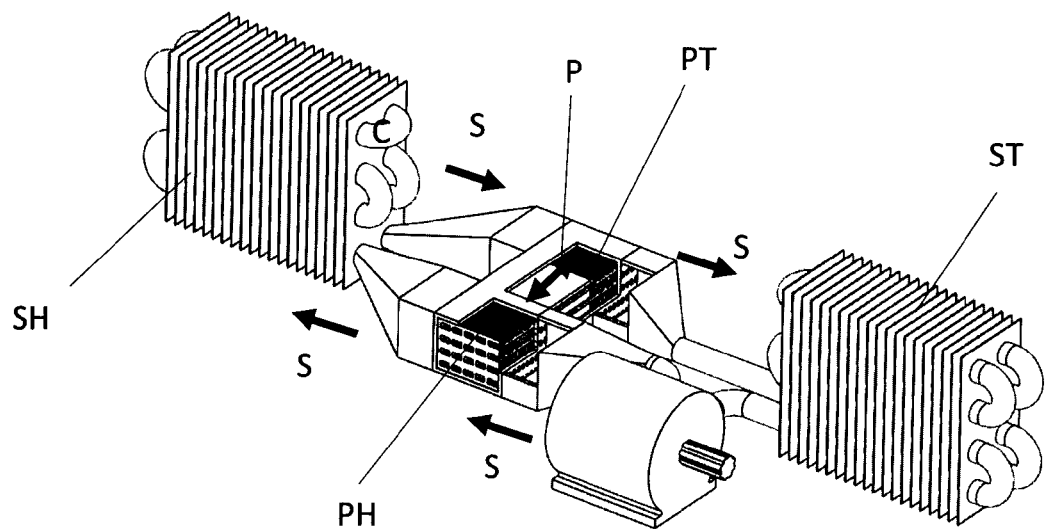
Fig. 14B
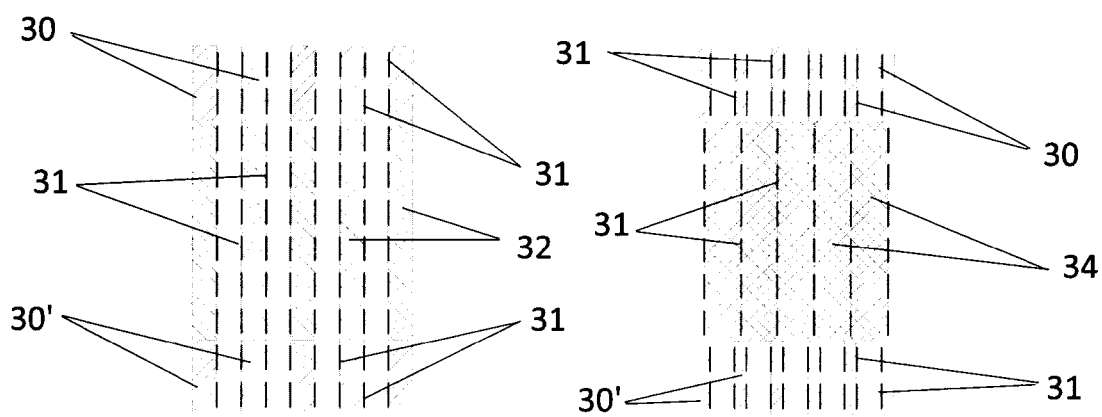
Fig. 15A
Fig. 15B

Detail A

METHOD FOR HEAT TRANSFER IN THE EMBEDDED STRUCTURE OF A HEAT REGENERATOR AND THE DESIGN THEREOF

This invention concerns a method for heat transfer in the embedded structure of a heat regenerator and the design thereof, i.e., it concerns the design of related heat regenerators that operate on the basis of the described method and enable a reduction of the pressure drop for the fluid flowing through the heat regenerator and simultaneously enable an increase in the power density of a device that uses a heat regenerator. This invention introduces a new method for the operation of passive and active heat regenerators and enables substantially lower viscous (pressure) losses and enables substantially lower fluid-pumping (viscous, pressure) losses. This is due to the fact that the fluid in this particular method of this invention does not oscillate along the regenerator (in the direction of the temperature gradient that is established in the regenerator), but oscillates approximately perpendicularly to the direction of the temperature gradient in the regenerator.

Heat regenerators are a special form of heat exchanger that serve for intermittent thermal storage and heat transfer between the working (heat-transfer) fluid and the regenerator material (matrix). In general, we distinguish between two types of heat regenerators: static heat regenerators (FIG. 1) and moving heat regenerators. Static regenerators have a porous structure through which the working fluid oscillates. The fluid transfers heat to the porous structure or absorbs the stored heat from the porous structure. The first application of a static regenerator can be traced back to Robert Stirling in 1816. Therefore, it is a well-known technology.

In technologies such as Stirling or thermo-acoustic devices the working fluid (the gas) oscillates (up to >=60 Hz) through the porous matrix of the regenerator. In this case on one side of the regenerator there is heat sink (or a hot heat exchanger) through which the heat is transferred out of the system. On the other side of the regenerator, there is a heat source (or cold heat exchanger) through which the heat is transferred to the system. Here it makes sense to mention the technology of pulsed tubes. These, for instance, can be seen in the following patents (US2016281638 (A1), CN105841421 (A), CN105508077 (A), WO2016146580 (A1), JP2013167220 (A), US2012151912 (A1), US2011314805 (A1), WO2010139316 (A2), JP2013117321 (A), U.S. Pat. No. 6,560,970 (B1), US2011100023 (A1), US2003196441 (A1), US2017045274 (A1), US2014238047 (A1), US2013291565 (A1)).

Several different heat regenerator designs can be found in the technical literature (R. K. Shah, D. E. Metzger (Ed); Regenerative and recuperative heat exchangers, American Society of Mechanical Engineers ASME, 1981, p. 86; M. B. Ibrahim, R. C. Tew Jr., Stirling Convertor Regenerators, 1st Edition, CRC Press; 2011; p. 487; D. Beck, D. G. Wilson, Gas-Turbine Regenerators, 1st ed., 1996, Springer, p. 250; F. W. Schmidt, J. A. Willmott, Regenerative and recuperative heat exchangers, Series in thermal and fluids engineering, ASME, 1981; p. 352; B. S. Baclic, G. D. Dragutinovic, Operation of Counterflow Regenerators, Computational Mechanics, Developments in Heat Transfer, Vol 4, 1998, p. 208).

All the currently known solutions and designs of heat regenerators need to establish a temperature difference (usually a large difference) between the heat source and the heat sink. If this condition is not fulfilled the device will not operate. This requires a particular design and construction for the porous matrix of the heat regenerator that enables a sufficiently large heat transfer surface to act between the regenerator matrix and the working fluid as well as the appropriate length of the heat regenerator.

The flow of the working fluid in all known examples takes the form of oscillation along the length of a heat regenerator (FIG. 1). The larger the number of thermodynamic cycles per unit of time (frequency) during which the heat is transferred or absorbed to/from the regenerator, the higher should be the velocity of the working fluid. An increase in the frequency increases the power density of the device, i.e., the specific power per unit mass of regenerator material. Since the regenerator matrix represents a porous structure, it is well known to the expert that the rapid oscillation of the working fluid through the porous structure leads to higher pressure losses, which are a consequence of the viscous forces (this is especially problematic for a working fluid in liquid form). As a consequence, the pressure losses also represent the internal generation of heat as well as a significantly decreased energy efficiency with respect to the device.

Heat regenerators are also used in caloric technologies, which can be further divided to magnetocaloric, electrocaloric, elastocaloric, barocaloric and multicaloric. And for all these mentioned caloric technologies, a special sort of regenerator is used, which has the property that under the influence of an external change of applied force (i.e., pressure, stress) or field (i.e., electric, magnetic), their temperature can be caused to decrease or increase. We refer to these regenerators as active caloric regenerators. The first people to introduce the idea of an active (magnetocaloric) regenerator were J. A. Barclay and W. A. Steyert in 1982 (U.S. Pat. No. 4,332,135). Also in caloric regenerators the working fluid oscillates through the porous matrix in the direction of the temperature gradient, which means along the regenerator. Long-term research in this specific field led to the conclusion that for the efficient transfer of heat (in the case of a liquid as the working fluid) the porous structure should have a porosity of between 20 and 40% (A. Kitanovski, J. Tušek, U. Tomc, U. Plaznik, M. Ožbolt, A. Poredoš, Magnetocaloric Energy Conversion: from Theory to Applications, Springer International Publishing, 2015, p. 456).

For the efficient transfer of heat in caloric regenerators, liquids are usually applied as the heat transfer fluids (i.e., water, water with freezing suppressants, oils, metals in the liquid state, secondary refrigerants, refrigerants, etc.). For the highest possible power density, the working fluid in the active caloric regenerator should oscillate as fast as possible through the mentioned regenerator. The regenerator has to have a very high heat transfer surface, which consequently means a low porosity of the regenerator. Since liquids have a higher viscosity and density than gases, the oscillation of liquids through active caloric regenerators with a small porosity present difficulties related to the viscous losses. This leads to the undesirable generation of heat (because of the energy dissipation), a very large pressure drop and a related increase in the pumping power needed for the fluid's oscillation. Both the pumping power and the energy dissipation limit the energy efficiency of active caloric regenerators. In order to maintain the relatively high energy efficiency of the caloric regenerator, the frequency of operation should be limited to below 5 Hz (i.e., the number of thermodynamic cycles per unit of time).

This is why most of the caloric regenerators operate at low frequencies. This can also be seen from FIG. 2. The usual type of magnetocaloric regenerator does not enable energy-efficient operation at high frequencies (number of thermodynamic cycles per unit of time). Following the curve for the specific power per unit of mass for the magnetocaloric material, this will start to decrease at higher frequencies of operation, in the theoretical example of FIG. 2, this is between 8 and 10 Hz. The reason for this is the already-mentioned fluid friction and the generation of heat due to energy dissipation. If the porosity of the regenerator is increased, the viscous losses will be smaller; however, the heat transfer surface will be also smaller. A more obvious influence of the losses, compared to the cooling power, can be observed in a decrease of the coefficient of performance (COP) of the cooling cycle (the ratio of the cooling power to the total input power for the cooling system). Without considering the pumping power, the COP can be substantially higher. The reason for such a substantial decrease of energy efficiency is therefore the pumping losses, which are the result of the viscous losses due to the oscillation of the working fluid along the porous structure of the active regenerator. The higher the frequency, the larger these losses.

An overview of the technical literature, including patents and patent applications (i.e. A. Kitanovski, J. Tušek, U. Tomc, U. Plaznik, M. Ožbolt, A. Poredoš, Magnetocaloric Energy Conversion: from Theory to Applications, Springer International Publishing, 2015, p. 456; DE 3833251 C1, EP 2615393 A2, SI24240 A, U.S. Pat. Nos. 5,743,095, 6,022, 486, US2004/0093877 A1, US2010/0107654 A1, US2012/0079834 A1, US2012/0222427 A1, US2013/0247588 A1, US2016/0069596 A1, US2017/0130999 A1, WO2017/162768 A1) points to the fact that all caloric regenerators are designed and constructed in such a way that the fluid oscillates along the regenerator; therefore, in the direction in which in the whole regenerator (that can also consist of different materials) is in steady-state operation a temperature gradient is established.

Despite the fact that the oscillation of the working fluid along the regenerator's matrix leads to heat generation and large viscous losses, there is no patent, no patent application and no technical literature published anywhere in the world that suggests another method for the motion of the fluid through the regenerator can be applied.

The method of heat transfer with a unidirectional fluid flow in an embedded structure of the heat regenerator based on this invention brings about a new principle for the operation of passive and active regenerators, and enables substantially lower viscous (pressure) losses for fluid pumping, compared to any existing method. The primary characteristic of this invention is in the fact that the working fluid does not oscillate along the regenerator matrix (the direction of the temperature gradient that is established in the total regenerator assembly), but oscillates perpendicularly to the longitudinal axis of the regenerator (perpendicular to the direction of the temperature gradient in the total regenerator assembly).

In the method of this invention two (primary and secondary) fluids are applied. These two fluids serve for the heat transfer in the embedded structure of the regenerator, which consists of multiple hydraulically separated segments of regenerator matrices and four heat exchangers: the primary cold heat exchanger PH, the primary hot heat exchanger PT, the secondary cold heat exchanger SH and the secondary hot heat exchanger ST. The primary (first) fluid P oscillates along the width of the porous structure of the regenerator and transfers heat from the primary cold heat exchanger PH into the primary hot heat exchanger PT. In such an operation an equal volume of fluid acts in one thermodynamic cycle on a much shorter path than is the case with any currently known solution (which is schematically shown in FIG. 1). The secondary fluid circulates (unidirectional flow) and flows through all four heat exchangers: PH, PT, SH, ST.

The embedded structure of the heat regenerator, which operates on the basis of the presented method, is composed of:

The hydraulically separated segments, which contain the porous regenerator's matrices and disable the longitudinal flow of the primary (first) fluid P, which is the working fluid in the regenerator matrices;

The primary hot heat exchanger PT, which in the case of the cooling device or the heat pump enables heat transfer from the oscillatory flow of the primary (first) fluid P to the unidirectional flow of the secondary (second) fluid S on the hot side of the embedded structure of the regenerator;

The primary cold heat exchanger PH, which in the case of a cooling device or a heat pump enables heat transfer from the unidirectional flow of the secondary (second) fluid S to the oscillating flow of the primary (first) fluid P on the cold side of the embedded structure of the regenerator;

The secondary cold heat exchanger SH, which is positioned on the side of the heat source and serves in the case of a cooling device or a heat pump for heat transfer into the secondary (second) fluid S;

The secondary hot heat exchanger ST, which is positioned on the side of the heat sink and serves in the case of the cooling device or the heat pump for the heat transfer from the secondary (second) fluid S;

The secondary (second) fluid S, which connects the heat source and the heat sink through the heat exchangers PT and PH;

The flow of secondary (second) fluid S through the primary hot heat exchanger PT, which is counter directed to the flow of the secondary (second) fluid S in the primary cold heat exchanger PH;

The system for pumping of secondary (second) fluid S;

The system for oscillation of the primary (first) fluid P.

The invention is described in more detail on the basis of design examples and the corresponding figures, which show:

FIG. 1 example of a static heat regenerator with oscillation of the fluid flow (state of the art);

FIG. 2 graph of a caloric device's operation in terms of the frequency (number of thermodynamic cycles per unit of time);

FIG. 3 heat regenerator operating principle as the method of heat transfer by this invention;

FIG. 4A fundamental operation example of the invention, where the oscillatory flow of the primary (first) fluid P is based on the operation of electro-mechanical elements;

FIG. 4B implemented operating example of the invention, where the oscillatory flow of the primary (first) fluid P is based on the operation of electro-mechanical elements;

FIG. 5 implemented example of pumping of the primary (first) fluid P by means of the piezo-electric element and the hydraulic displacement amplifier;

FIG. 6 implemented example of the pumping of the primary (first) fluid P by means of the piezo-electric element and the mechanical displacement amplifier;

FIG. 7 implemented example of the pumping of the primary (first) fluid P by means of the piezo-electric actuator without the displacement amplifier;

FIG. 8 implemented example of pumping of the primary (first) fluid P by means of the electromotor;

FIG. 9 implemented example of pumping of the primary (first) fluid P by means of the electromagnet;

FIG. 10 schematic of the system with the one pump and the 4/2 directional valve in the primary circuit;

FIG. 11 schematic of the concept with two pumps;

FIG. 12 schematic of the concept with four 2/2 on/off directional valves;

FIG. 13A schematic of the oscillating fluid flow along the heat regenerator with the pressure wave generation by means of the continuous pump operation and opening/closing of the 2/2 directional valve; example of open 2/2 directional valve; fluid flow pulse in the direction of the pump operation;

FIG. 13B schematics of the oscillating fluid flow along the heat regenerator with the pressure wave generation by means of the continuous pump operation and opening/closing of the 2/2 directional valve; example of closed 2/2 directional valve; fluid flow pulse in the counter-direction of the pump operation;

FIG. 14A fundamental concept of the invention where the oscillation of the primary (first) fluid P is based on the principle of the electro-hydrodynamics or electro-kinetics of the fluid;

FIG. 14B implemented operating example of the invention where the oscillation of the primary (first) fluid P is based on the principle of the electro-hydrodynamics or electro-kinetics of the fluid;

FIG. 15A depiction of the hydraulically separated segments of the whole assembly of the heat regenerator, which is in contact with heat exchangers PT and PH, built from the ordered structures (e.g., parallel plates, zig-zag plates, honeycomb, plates with treated surface);

FIG. 15B depiction of the hydraulically separated segment of the whole assembly of the heat regenerator, which is in contact with heat exchangers PT and PH, built from a porous matrix (e.g., packed bed, foam, bundles of wires);

FIG. 16A example of the segment of the caloric regenerator, built from parallel plates of magnetocaloric material with electrodes positioned on top and where the droplets are separated between the plates;

FIG. 16B example of the segment of the caloric regenerator, built from parallel plates of magnetocaloric material with electrodes on top and where the droplets are next to each other on the plate's surface;

FIG. 17A example of a segment of the caloric regenerator, built from parallel plates of magnetocaloric material with an extended surface with electrodes positioned on the top and where the droplets are separated between the plates;

FIG. 17B example of the segment of the caloric regenerator, built from parallel plates of magnetocaloric material with an extended surface with electrodes positioned on top and where the droplets are next to each other on the plate's surface;

FIG. 17C example of the segment of the caloric regenerator, built from parallel plates of magnetocaloric material with an extended surface with electrodes, where the close-up picture of the plates with an extended surface is shown;

FIG. 18A shows the bottom side of the caloric regenerator where the electrodes are applied, by which the primary (first) fluid P is moved by means of a change in the electric potential (based on the electrowetting principle) through pyramid-like channels;

FIG. 18B cross-section of the caloric regenerator, where the pyramid-like channels are positioned next to each other;

FIG. 19A shows the bottom side of the caloric regenerator where the electrodes are applied, by which the primary (first) fluid P is moved by means of a change in the electric potential (based on the electrowetting principle) through round channels;

FIG. 19B cross-section of the caloric regenerator, where the round channels are positioned next to each other;

FIG. 20A bottom and top sides of the caloric regenerator, the surface of which is covered with channels of different shapes;

FIG. 20B bottom side of the caloric regenerator, the surface of which is covered with meandering channels;

FIG. 20C top side of the caloric regenerator, the surface of which is covered with labyrinth channels;

FIG. 20D bottom side of the caloric regenerator, the surface of which is covered with zig-zag channels;

FIG. 20E top side of the caloric regenerator, the surface of which is covered with labyrinth channels;

FIG. 20F bottom side of the caloric regenerator, the surface of which is covered with labyrinth channels;

FIG. 20G top side of the caloric regenerator, the surface of which is covered with labyrinth channels;

FIG. 20H bottom side of the caloric regenerator, the surface of which is covered with cross channels;

FIG. 21 schematic of the fluid oscillation mechanism based on the electro-osmosis principle; primary (first) fluid P flows in the heat exchanger PH; regenerator is subjected to the positive field or force change; detail A shows electro-hydrodynamic conditions of the primary (first) fluid P inside the heat exchanger;

FIG. 22 schematic of the fluid-oscillation mechanism based on the electro-osmosis principle; primary (first) fluid P flows in the heat exchanger PH; regenerator is subjected to the negative field or force change; detail A shows electro-hydrodynamic conditions of the primary (first) fluid P inside the heat exchanger;

FIG. 23 example of the heat exchanger PT and the heat exchanger PH structures; the heat regenerator is positioned between PT and PH;

FIG. 24 example of the heat exchanger PT or the heat exchanger PH structure;

FIG. 25A example of the whole structure of the heat exchanger PT or the heat exchanger PH;

FIG. 25B example of the whole structure of the heat exchanger PT or the heat exchanger PH in cross-section;

FIG. 26 example of the heat exchanger PT or the heat exchanger PH structure;

FIG. 27 example of the heat exchanger PT or the heat exchanger PH structure with perpendicular channels for the electro-hydrodynamic pumping of the primary (first) fluid P;

FIG. 28 example of the heat exchanger PT or the heat exchanger PH structure with zig-zag channels for the electro-hydrodynamic pumping of the primary (first) fluid P;

FIG. 29 example of the heat exchanger PT or the heat exchanger PH structure with triangular channels for the electro-hydrodynamic pumping of the primary (first) fluid P.

The method of heat transfer in the embedded structure of the heat regenerator presented by this invention and different design examples are described in the following text in more detail.

For a simpler explanation of the operating principle of the presented heat-transfer method using this invention, FIG. 3 shows the operation of the embedded structure of the heat regenerator. The method of heat regeneration for the oscillation of the fluid flow of the primary (first) fluid P is performed perpendicularly to the direction of the temperature gradient in the total embedded structure of the regenerator and with the unidirectional fluid flow of the secondary (second) fluid S, which connects the heat source and the heat sink via the secondary hot heat exchanger ST and the secondary cold heat exchanger SH.

The method of this invention can be explained by the example of the operation of the caloric cooling device. The operation of this device can be described by four basic thermodynamic processes:

magnetization, polarization, compressive or tensile load deformation of the caloric regenerator. The temperature of the matrix of the caloric regenerator is increased;

heat transfer under a constant external field or constant external force applied to the caloric regenerator. The primary (first) fluid P in this phase of its oscillation flows through the caloric regenerator in the direction towards the primary hot heat exchanger PT. The primary (first) fluid P absorbs the heat from the hydraulically separated segments of the caloric regenerator and transfers the heat to the primary hot heat exchanger PT. The primary heat exchanger PT transfers the heat to the secondary (second) fluid S;

demagnetization, depolarization, compressive or tensile stress release of the caloric regenerator. The temperature of the matrix of the caloric regenerator is decreased;

heat transfer in the absence of a field or force applied to the caloric regenerator. The primary (first) fluid P in this phase of its oscillation flows through the caloric regenerator in the direction towards the primary cold heat exchanger PH. The primary (first) fluid P transfers heat to the hydraulically separated segments of the caloric regenerator and absorbs heat in the primary cold heat exchanger PH. The primary cold heat exchanger PH absorbs the heat from the secondary (second) fluid S.

The thermodynamic processes can also be different, depending on the type of thermodynamic cycle.

FIGS. 4A and 4B show the concept of the operation of the heat regenerator using this invention, for which the oscillation of the flow of the primary (first) fluid P from FIG. 3 is established using electro-mechanical elements.

The primary hot heat exchanger PT and the primary cold heat exchanger PH are positioned in housing 1 between the elements 2 for the oscillation of the fluid flow of the primary (first) fluid P. The unidirectional fluid flow of the secondary (second) fluid S is in the direction of the arrow A, from the heat sink ST to the cold heat exchanger PH. The unidirectional fluid flow of the secondary (second) fluid S is in the direction of the arrow B from the primary cold heat exchanger PH towards the heat source SH. The unidirectional fluid flow of the secondary (second) fluid S is in the direction of the arrow C from the heat source SH to the primary hot heat exchanger PT. The unidirectional fluid flow of the secondary (second) fluid S is in the direction of the arrow D from the primary hot heat exchanger PT towards the heat sink ST. Between both primary heat exchangers, PT and PH, there is positioned a porous regenerative material (matrix), which is a part of the regenerator 4 (shown in FIG. 3) with hydraulically separated segments.

The primary hot heat exchanger PT, the primary cold heat exchanger PH, the secondary hot heat exchanger ST and the secondary cold heat exchanger SH consist of materials chosen from the groups of metals, polymers, carbons and carbon materials (carbon, graphite, graphene), such as composite materials, ceramic materials, cement, concrete or rock material and their combinations.

The primary (first) fluid P and the secondary (second) fluid S are chosen from the groups of liquids, liquid metals, gases or refrigerants.

The mechanism, the device or the physical phenomenon that enables the fluid flow of the primary (first) fluid P can be based on a mechanical motion, a capillary effect, electro-kinetics, electro-hydrodynamics, magneto-hydrodynamics, electrowetting or magnetowetting or the heat-pipe principle. The mechanism, device or physical phenomenon that enables the fluid flow of the secondary (second) fluid S is based on a mechanical motion, a capillary effect, electro-kinetics, electro-hydrodynamics, magneto-hydrodynamics, electrowetting or magnetowetting, a heat-pipe principle or a vapour-compression process.

The porous regenerative material of the regenerator 4 in the hydraulically separated segments can be a caloric (magnetocaloric, electrocaloric, elastocaloric, barocaloric, multicaloric) material, combined with any other material chosen from the group of metals, ceramics, glass, composites, carbon or carbon materials, polymers or composites of polymer materials, metamaterials, liquid crystals.

When the device is made up of caloric or a combination of caloric and other materials in the form of the porous regenerative matrix in the hydraulically separated segments or parts, then the device that can be created on this basis belongs to the group of caloric refrigerators or coolers, caloric heat pumps or caloric power generators.

The porous regenerative material of the regenerator 4 in the hydraulically separated segments can also be chosen from the group of desiccant materials such as activated alumina, aerogel, benzophenone, bentonite, calcium chloride, calcium oxide, calcium sulphate, cobalt chloride, copper sulphate, lithium chloride, lithium bromide, magnesium sulphate, magnesium perchlorate, molecular sieve, potassium carbonate, potassium hydroxide, silica gel, sodium, sodium chlorate, sodium chloride, sodium hydroxide, sodium sulphate, and sucrose.

When the device is made up of desiccant material, such as the porous regenerative material matrix in hydraulically separated segments, then the device that can be created on this basis belongs to the group of adsorption refrigerators or chillers, adsorption heat pumps or adsorption drying devices, absorption refrigerators or chillers, absorption heat pumps or absorption dryers, or catalytic converters, or chemical reactors.

The porous regenerative material of the regenerator 4 of the hydraulically separated segments can be chosen from the group of materials that are not caloric and include the following: metals, ceramics, glass, composites, carbon and carbon materials, polymers or composites from polymer materials, or metamaterials, or minerals, or cement, concrete, rocks, or a combination of at least two of the materials mentioned here. When the device comprises such materials in the form of a porous regenerator in the hydraulically separated segments, then the device that can be created on this basis belongs to the group of mechanical Stirling refrigerators or coolers, mechanical Stirling heat pumps, mechanical Stirling power generators, thermoacoustic refrigerators or coolers, thermoacoustic heat pumps, thermoacoustic power generators, pulsed tube refrigerators, Gifford-McMahon (GM) refrigerators, furnaces or boilers, catalytic converters or chemical reactors.

The number of hydraulically separated segments is lower than 10,000, preferably between 1000 and 10,000, more preferably between 100 and 1000 and even more preferably between 10 and 100.

FIGS. 5-12 show different design examples of the electromechanical elements for the oscillation of the fluid flow of the primary (first) fluid P.

FIG. 5 shows the first design concept of the mechanism for the oscillation of the fluid flow of the primary (first) fluid P from FIG. 3. This concept involves the piezo-electric element 5 and the hydraulic displacement amplifier 6. The hydraulic displacement amplifier 6 operates under the principle of the different contact surfaces. It is fulfilled with incompressible liquid, which transforms the small displacement of the large surfaces into the large displacement of smaller surfaces. The concept with the funnel allows small displacements of the piezoelectric element 5 and the piston 7 with the membrane are additionally strengthened. This makes it possible to reach the desired fluid flow through the structure of the regenerator. Both heat exchangers, PT and PH, are placed in the housing between the piezoelectric element 5 and hydraulic displacement amplifier 6, where on one side there is a piston 7 and a membrane, and with a piston 7' and a membrane and a spring 8 on the other side.

FIG. 6 shows the second design concept of the mechanism of the fluid-flow oscillation of the primary (first) fluid P from FIG. 3. The concept is based on the similar solution that is shown in FIG. 5; however, with the difference being that the displacement-amplifying mechanism is different. Both the heat exchangers, PT and PH, are positioned similarly to the concept presented in FIG. 5. However, in this design, the amplification is performed by the mechanical displacement amplifier. The mechanical displacement amplifiers, which are based on the leverage 9, are mostly applied in practice. When the composite piezoelectric element 10 is charged by electric current, it will be elongated. When the electrical current is disconnected, the piezo-electric element contracts. In this way the oscillatory motion of the piezo-electric element 10 provides the basis for the motion of the primary (first) fluid P.

FIG. 7 shows the third design concept of the oscillation of the fluid flow of the primary (first) fluid P from FIG. 3. Both heat exchangers, PT and PH, are positioned like in the case described in FIG. 5. However, in the case presented in FIG. 7, the concept is based on the piezo-electric element 11, which is directly connected to the piston 12 with the membrane without the displacement amplifier. In order to achieve the desired displacements of the membrane, a larger number of piezoelectric elements 11 arranged in series is required.

FIG. 8 shows the fourth design mechanism of the oscillation of the fluid flow of the primary (first) fluid P from FIG. 3. Both heat exchangers, PT and PH, are positioned like in the design concept described in FIG. 5. However, the design concept of the high-frequency pulsation comprises the brushless DC electromotor 13 and the rotor 14, to which the mechanical connection is eccentrically attached. This transforms the rotational movement of the electromotor 13 into the linear motion of the membrane. The membrane consequently oscillates the fluid through the structure of the regenerator. The reason for the selection of the DC brushless electromotor 13 is that these motors provide silent operation, are more reliable, have a higher energy efficiency and a larger ratio between the moment and the mass compared to a brushed electromotor. One of the important features is also that they do not require an air flow for the cooling and can therefore be closed into the housing, which prevents any contact with dirt and water.

FIG. 9 shows the fifth design concept of the oscillation of the fluid flow of the primary (first) fluid P from FIG. 3. Both heat exchangers, PT and PH, are positioned like in the case described in FIG. 5. However, in this case the oscillation of the fluid flow of the primary (first) fluid P is enabled by electromagnet 15 positioned on one side, which can be switched on and off in a manner that the oscillation with the desired frequency is established, while on the other side, the piston 7' with the membrane and spring 8 are positioned. When the electric current flows through the electromagnet 15, this attracts the piston 7 with the membrane. During the motion of piston 7 and the membrane towards the electromagnet 15 the spring 17 is simultaneously compressed. After the disconnection of the electromagnet 15, the spring 17 enables the return of the piston 7 and the membrane in the starting position. The force of the spring 17 has to be substantially smaller than the force of the electromagnet, so as to not disturb its operation. However, the force should be sufficiently large so that during the disconnection of the electromagnet 15 there is a fast return of the piston 7 with membrane to the starting position.

FIG. 10 shows the sixth design concept of the oscillation of the fluid flow of the primary (first) fluid P from FIG. 3. This concept requires one pump 18 with a constant displacement of the fluid and a 4/2 directional valve 19. The pump with the constant fluid displacement 18 in the primary circuit pushes the fluid through the valve 19, which periodically changes the flow direction in the primary circuit through the structure of the regenerator. Therefore, in the cycle when the heat is generated, the fluid is pushed in one direction, and when the structure of the regenerator is cooled, the fluid is pushed in another direction. The second pump 20 in the secondary circuit constantly pushes the fluid through separated layers of the regenerator in one direction through the cold heat exchanger PH and the hot heat exchanger PT.

FIG. 11 shows the seventh design concept of the oscillation of the fluid flow of the primary (first) fluid P from FIG. 3. This concept consists of two pumps, 21 and 22, which are positioned one on each side of the regenerator structure and provide counter-fluid-flow with regards to each other. The operation of this mechanism is based on electronic control, which, with the appropriate frequency, periodically turns the pumps 21 and 22 on and off. In this way the change of the direction of the fluid flow in the structure of the regenerator can be achieved. The secondary fluid flow can be the same as in the case illustrated by FIG. 10.

FIG. 12 shows the eighth design concept of the oscillation of the fluid flow of the primary (first) fluid P from FIG. 3. This concept comprises four on/off 2/2 directional valves, 23, 24, 25, and 26, pump 27 and safety valve 28. The valves 23, 24, 25, and 26 are electronically controlled in such a way that the direction of the flow through the regenerator is periodically changed. In FIG. 12 all the 2/2 directional valves 23, 24, 25, and 26 are shown in their zero-position, which means there is no need for an electric current on the electromagnet for this position. The zero position of all four 2/2 directional valves 23, 24, 25, and 26 is chosen in such a way that they provide the first direction of the flow of the primary (first) fluid P through the regenerator. The pump 27 pushes the primary (first) fluid P through the opened valve 23 in the regenerator. From the regenerator, the primary (first) fluid P returns to the suction part of the pump through the opened valve 26. The valves 24 and 25 are closed for the first direction of the flow of the primary (first) fluid P. In order to change the direction of the flow of the primary (first) fluid P, the control electronics switches on all four electromagnets of the 2/2 directional valves 23, 24, 25, and 26. In this case the valve 25 is opened and the primary (first) fluid P of the primary circuit flows from the pump 27 to the other side of the regenerator (in FIG. 12 from the upper side). The exit of the primary (first) fluid P from the regenerator is in this second case from the bottom side. The primary (first) fluid P is returning to the suction part of the pump 27 through the opened valve 24. The fluid flow of the secondary (second) fluid S can be the same as in FIG. 10.

FIG. 13 shows the ninth design concept of the oscillation of the fluid flow of the primary (first) fluid P from FIG. 3, which does not require additional electro-mechanical components. The oscillation of the fluid flow of the primary (first) fluid P is based on pressure waves, which are the consequence of sudden openings and closings of the gap in the 2/2 directional valve 28. The pump 29 operates with unidirectional flow and continuously, whereas with the pulsating opening and closing 2/2 directional valve 28, pressure waves are created, which travel through the system. Therefore, in the system, the direction of the fluid flow of the primary (first) fluid P can be oscillating. FIG. 13A shows the state, where the 2/2 directional valve 28 is opened. The pump 29 pushes fluid in the x-direction towards the heat sink and also through the porous structure of the regenerator. Therefore, the pressure on the pressure side of pump 29 is higher than it is before the entrance to the valve 28, which is evident from the diagram p-x.

FIG. 13B shows the pressure conditions when the 2/2 directional valve 28 is closed for a short period while the pump 29 still operates. Because of the sudden closing of the fluid flow of the primary (first) fluid P, a sudden increase in the pressure occurs in the vicinity and before the 2/2 directional valve 28. The pressure in the vicinity and before the valve 28 is at this moment higher than the pressure on the pressure side of the pump 29, which is shown in the diagram p-x. Because of the higher pressure on the side of the valve 28, the flow of the fluid changes its direction and flows through the regenerator in the opposite direction towards the pump 29. With a periodic opening and closing of the valve 28, the oscillatory fluid flow of the primary (first) fluid P can be established through the regenerator.

FIGS. 14A and 14B show the case of the operation of the concept of this invention, for which the oscillation of the fluid flow of the primary (first) fluid P from FIG. 3, for which the concept of the electro-hydrodynamics or electro-kinetics of the fluid is applied. In the middle of the device the regenerator with the hydraulically separated segments of the fluid flow of the primary (first) fluid P is positioned. To the left and right of the regenerator two heat exchangers, PT and PH, are positioned. They serve for the heat transfer between the primary (first) fluid P and secondary (second) fluid S. Both heat exchangers, PH and PT, and the regenerator provide the channels for the primary (first) fluid P, and have electrodes for the electro-hydrodynamic propulsion of the primary (first) fluid P. The primary (first) fluid P is in this case in the form of a plural number of droplets, which perform the oscillatory motion between the regenerator and the heat exchangers. The motion is achieved with a change of the electric potential on the different electrodes. The system for the oscillation of the primary (first) fluid P is not shown in FIG. 14.

The secondary (second) fluid S circulates (unidirectional flow) and flows through all four heat exchangers; therefore, flowing through the primary cold heat exchanger PH, the primary hot heat exchanger PT, the secondary cold heat exchanger SH and the secondary hot heat exchanger ST. The system for the pumping of the secondary (second) fluid S is shown in FIG. 14B.

FIG. 15 shows the tenth design concept for the oscillation of the fluid flow of the primary (first) fluid P in FIG. 3, which is based on the principle of electrowetting. In the case of FIG. 15, the detail shows one of the hydraulically separated parts of the whole assembly of the heat regenerator, which is in contact with the heat exchanger PT and the heat exchanger PH.

FIG. 15A shows an example of the regenerator, which consists of an ordered structure of plates 32 (e.g., parallel plates, zig-zag plates, and plates with specially treated surfaces). In this case on the surfaces 30, 30' of ordered structures, the electrodes 31 are positioned. In the FIG. 15B an example of the regenerator is shown; it consist of the porous matrix 34 (e.g., packed bed, foam, bundles of wires). In this case electrodes with a certain distance in between are inserted into the heat regenerator. In both cases in FIGS. 15A and 15B the heat exchanger PT and the heat exchanger PH are designed in such a way that it enables the construction of channels for the oscillation of the fluid flow of the primary (first) fluid P. The electrodes 31 are positioned on the surface of the channels in both heat exchangers PT and PH.

The operation of the principle of electrowetting from FIGS. 14A and 14B is performed in two different ways. In both cases, because of an easier explanation, it is assumed that the material of the regenerator matrix is caloric (magnetocaloric or electrocaloric or elastocaloric or barocaloric or multicaloric).

The first principle operates in four processes of the operation of one thermodynamic cycle. In the first process, the primary (first) fluid P is in the form of droplets 35 and the fluid of the droplets, which are separated into two parts: one part of the droplets 35 is positioned in the hot heat exchanger PT, another part of the droplets 35 is positioned in the cold heat exchanger PH. The regenerator 4, which consists of caloric material, is exposed to the positive change of the external force or field (the temperature of the caloric material increases). In the second process, the external field or force on the regenerator 4 is still present. The primary (first) fluid P in the form of droplets 35, which is positioned in the hot heat exchanger PT, undergoes movement into the structure of the regenerator 4, due to the change of the electric potential on electrodes 31. Because of the heat transfer, the primary (first) fluid P in the form of droplet 35, absorbs heat from the caloric material of the regenerator 4. Then, under the unchanged force or field, the primary (first) fluid P in the form of droplets 35, undergoes movement back to the heat exchanger PT, where it transfers heat to the secondary (second) fluid S. The third process represents the change of the external field or force that acts on the caloric material, to the state without a field or without a force on the caloric material (the temperature of the caloric material decreases). In the fourth process of the operation, the primary (first) fluid P in the form of droplets 35, which is positioned in the cold heat exchanger PH, undergoes movement into the structure of the regenerator 4, due to the change of the electrical potential on the electrodes 31. Because of the heat transfer, the primary (first) fluid P in the form of droplet 35, transfers heat to the caloric material in the regenerator 4. Then, with the unchanged field or force, the primary (first) fluid P undergoes movement back to the cold heat exchanger PH, where it absorbs heat from the secondary (second) fluid S. The movement also occurs due to the change of the electrode potential on the electrodes 31.

The second case also operates in the four processes of a thermodynamic cycle, with the difference that the primary (first) fluid P in the form of droplets 35 is not separated into two parts. The droplets 35 are joined together in one part and are positioned in the hot heat exchanger PT and the regenerator 4 or in the cold heat exchanger PH and regenerator. In the first process the caloric material of the regenerator 4 is exposed to the positive change of the field or force (the temperature of the caloric material increases). The primary (first) fluid P in the form of droplets 35, which is at that moment positioned in regenerator 4, absorbs heat due to the heat transfer from the caloric material. Some of the droplets 35 are at that moment in the cold heat exchanger PH. In the second process, the regenerator 4 is still under an unchanged external field or force. The primary (first) fluid P in the form of droplets 35, undergoes movement towards the hot heat exchanger PT, due to the change of the electrical potential on the electrodes 31. The droplets 35, which absorbed heat in the regenerator 4, transfer the heat in the hot heat exchanger PT to the secondary (second) fluid S. The droplets 35, which were positioned in the cold heat exchanger PH, enter the regenerator 4. In the third process, the regenerator 4 is exposed to the negative change of the external field or force. Therefore, at the end of the process 4, the external field or force is no longer present (the temperature of the caloric material decreases). The primary (first) fluid P in the form of droplets 35, positioned in the regenerator 4, transfers heat to the caloric material. The fourth process runs under the unchanged field or force (no field or no force). The primary (first) fluid P in the form of droplets 35, performs movement towards the cold heat exchanger PH, due to the change of the electrical potential on the electrode 31. The droplets 35, which were in the regenerator 4, perform movement towards the cold heat exchanger PH, where they absorb heat from the secondary (second) fluid S. The droplets 35, which were positioned in the hot heat exchanger PH, enter the regenerator 4.

FIGS. 16 to 22 show the different concepts of the combination of electrodes and caloric material for the different designs for the motion of the primary (first) fluid P that are based on electrowetting.

Figure 1:
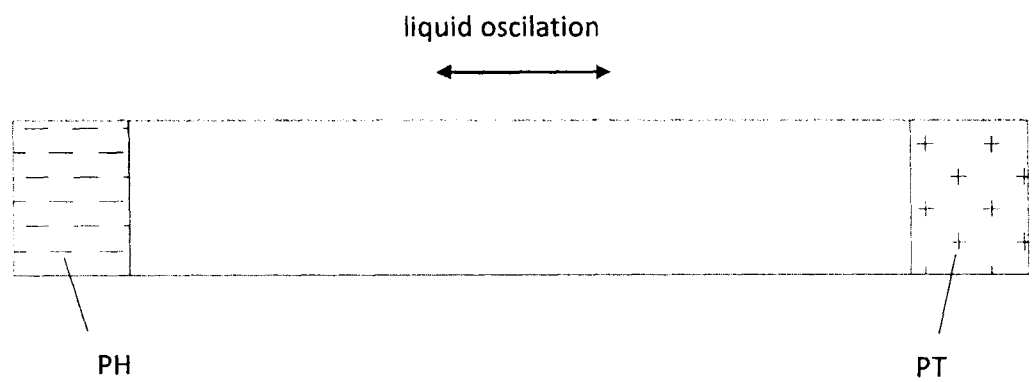
Figure 2:
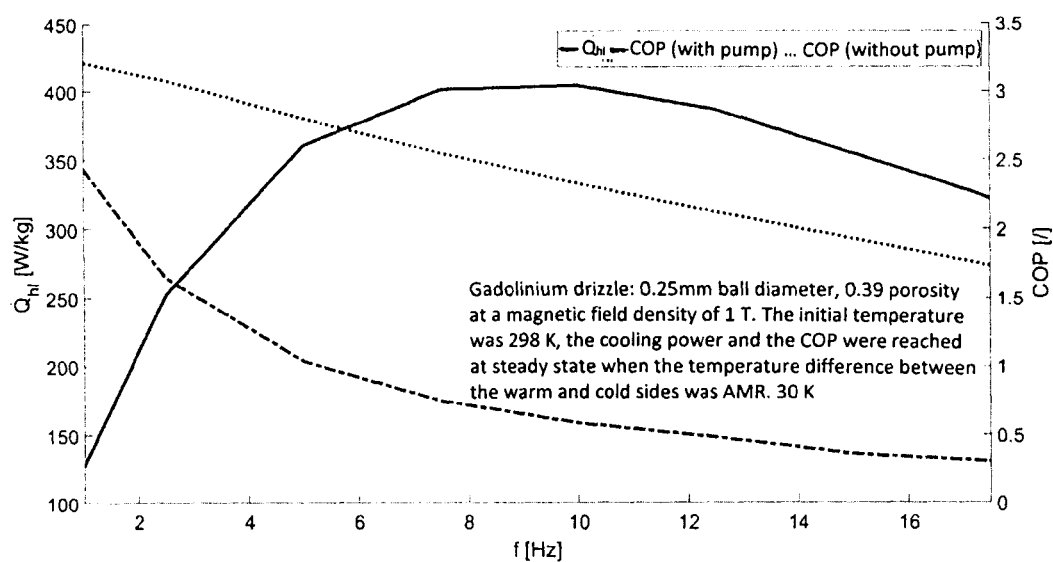
Figure 3:
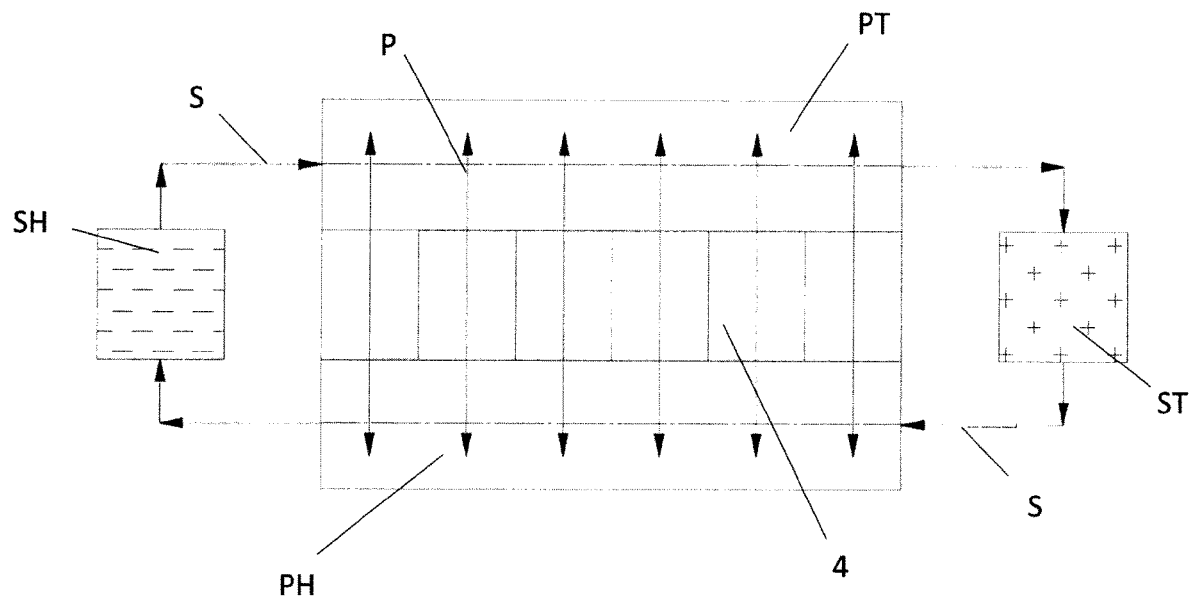
Figure 4A:
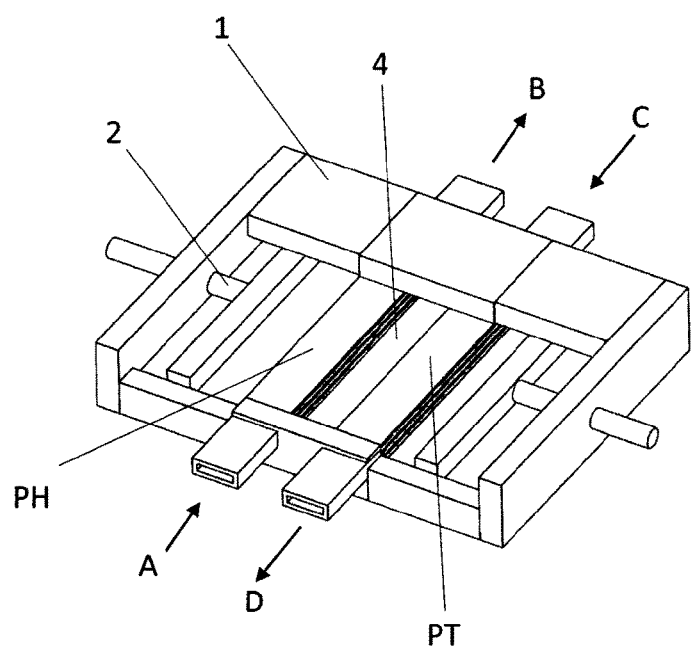
Figure 4B:
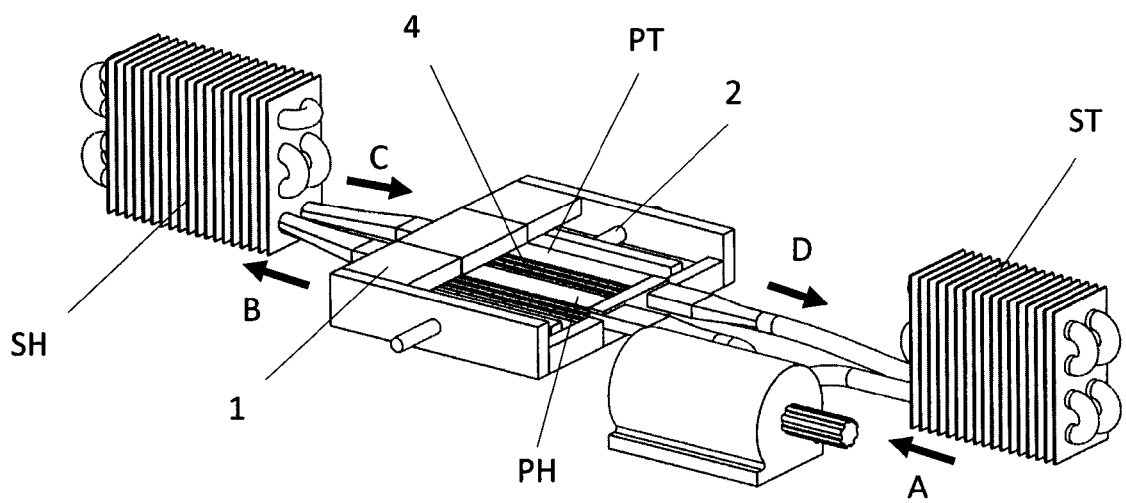
Figure 5:
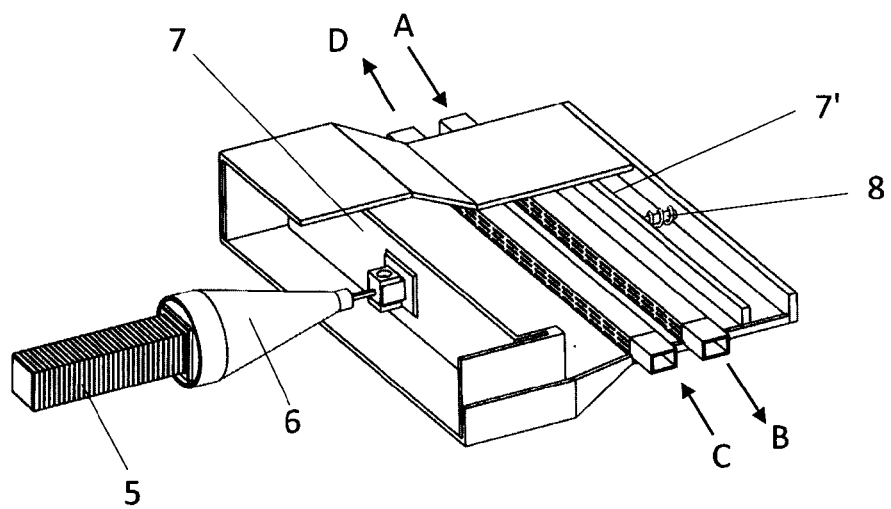
Figure 6:
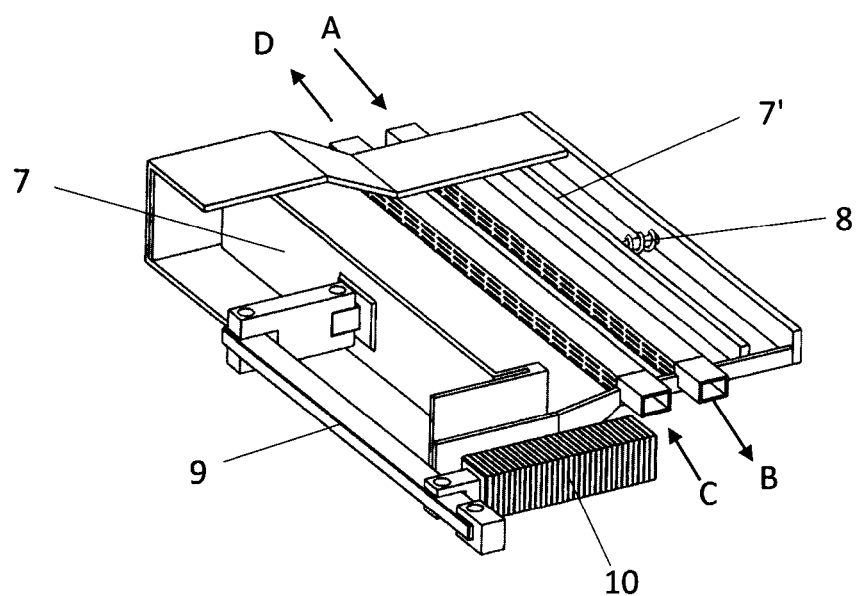
Figure 7:
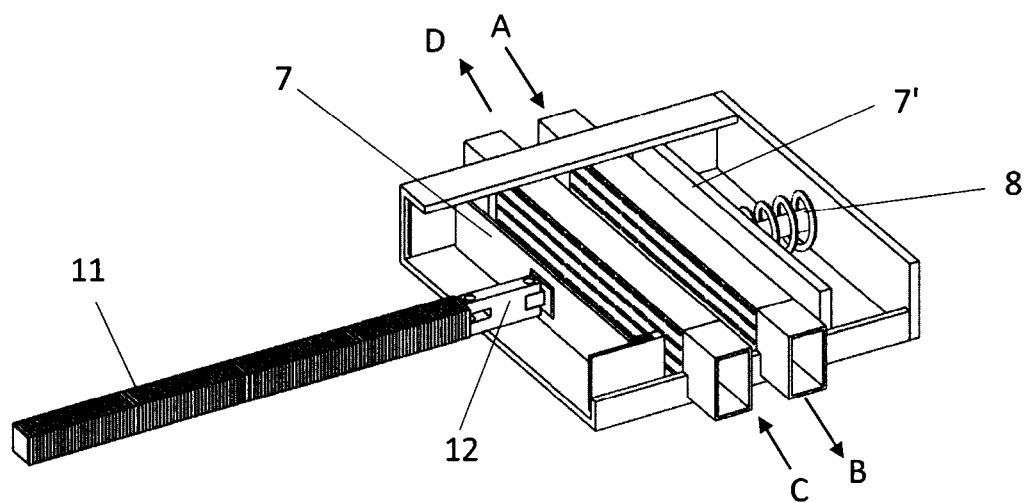
Figure 8:
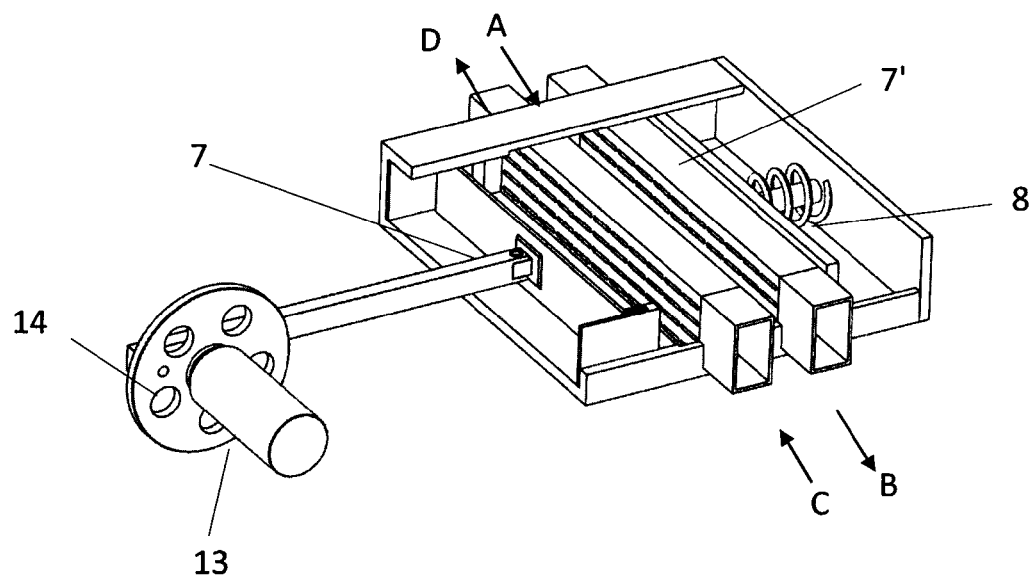
Figure 9:
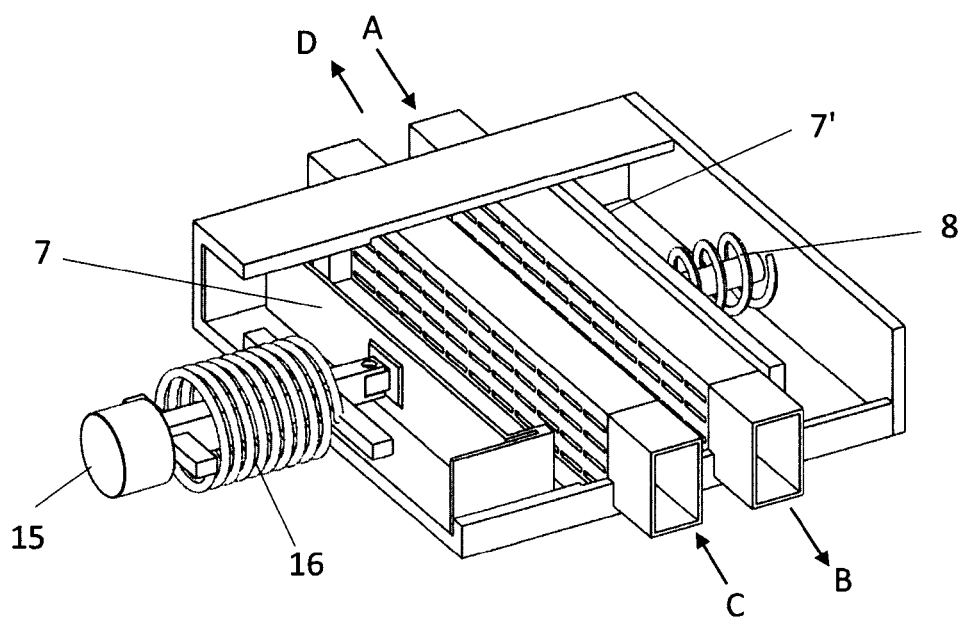
Figure 10:
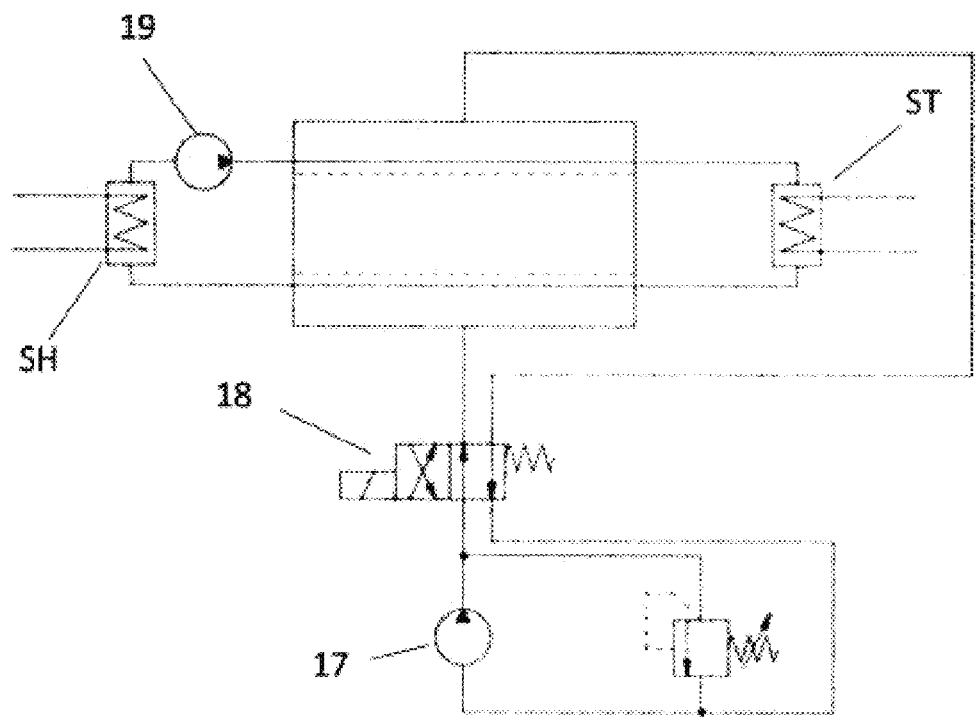
Figure 11:
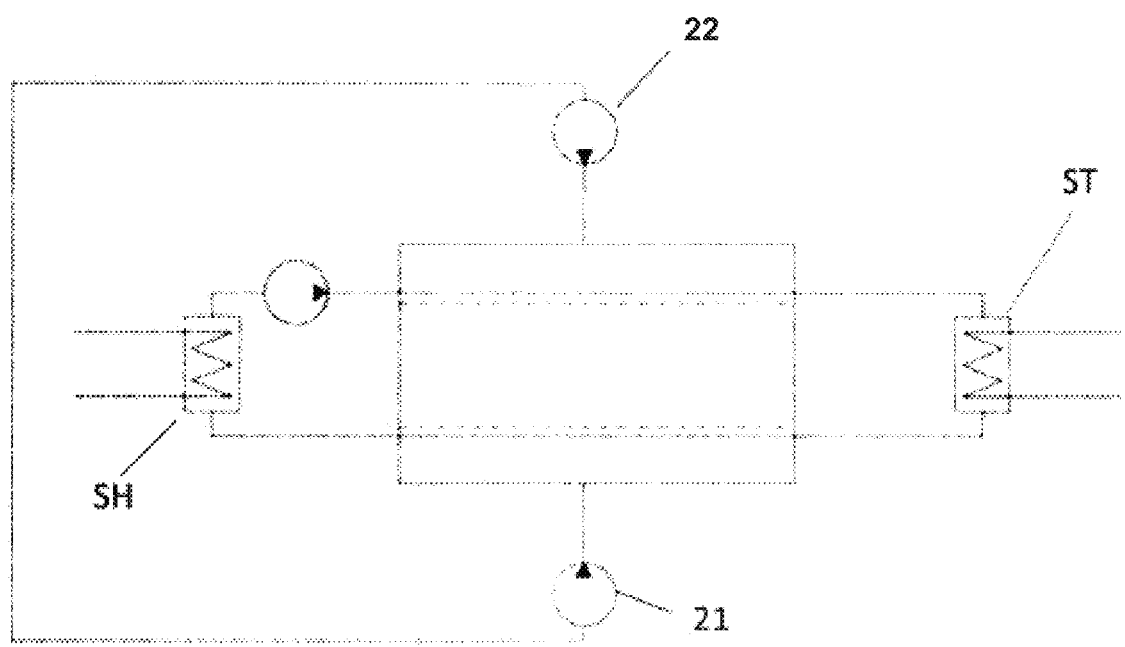
Figure 12:
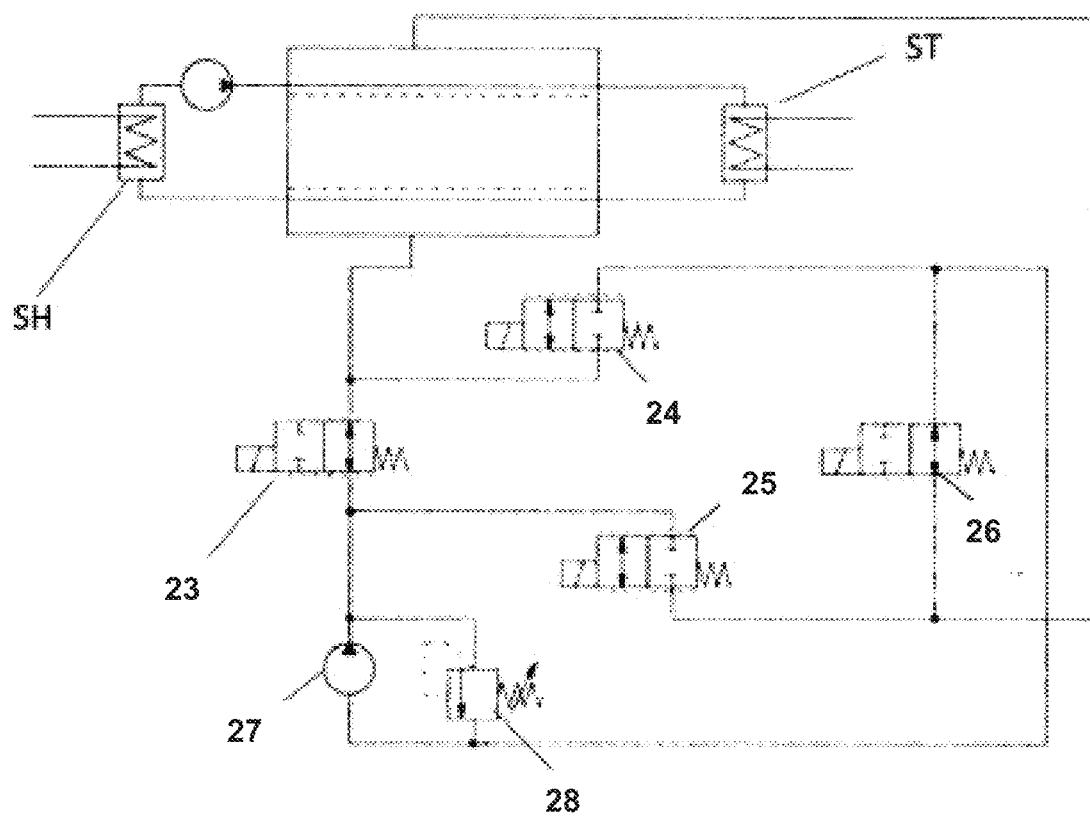
Figure 13A:
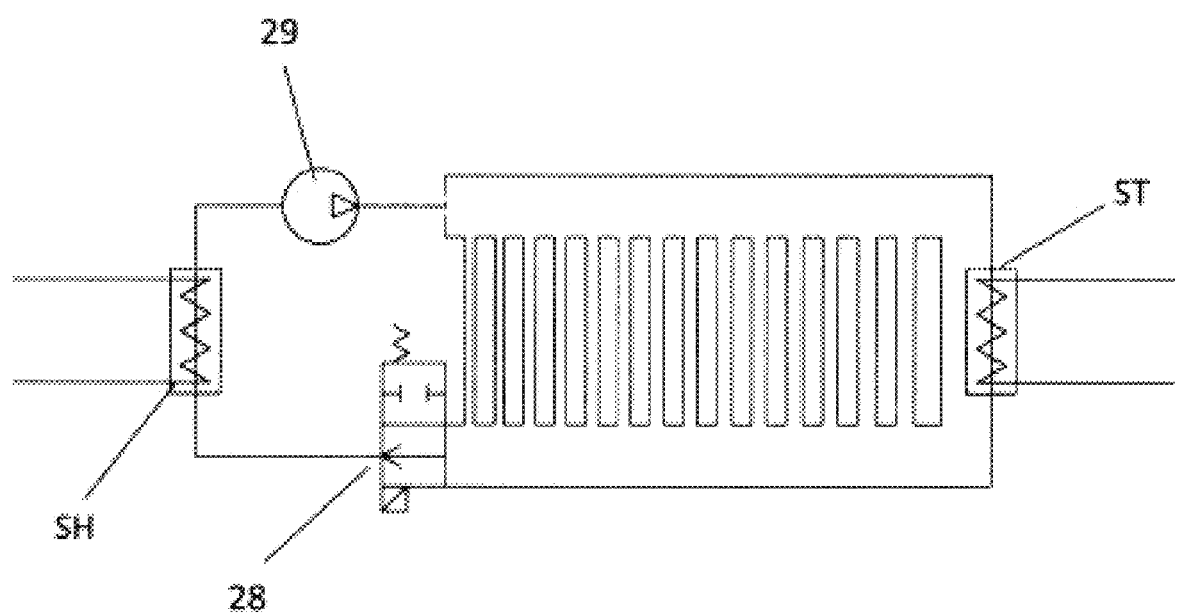
Figure 13B:
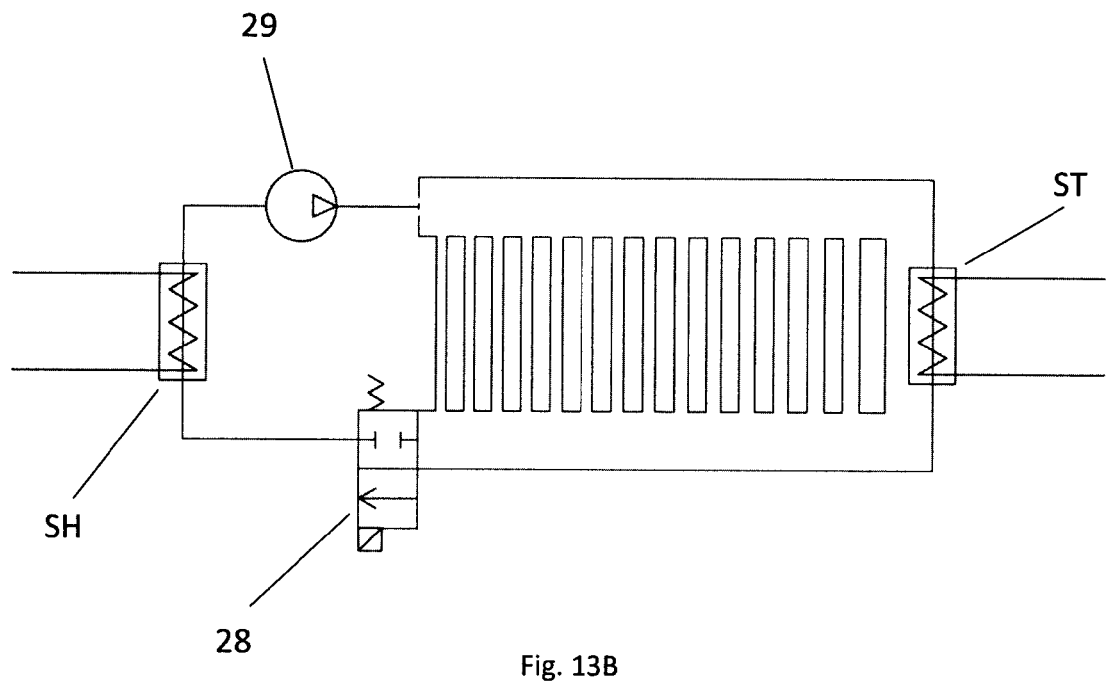
Figure 14A:
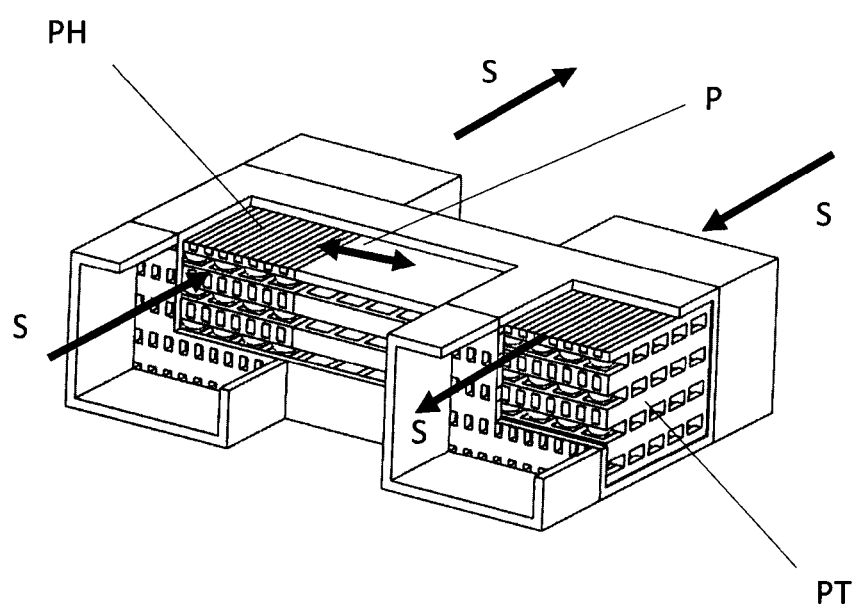
Figure 16A:
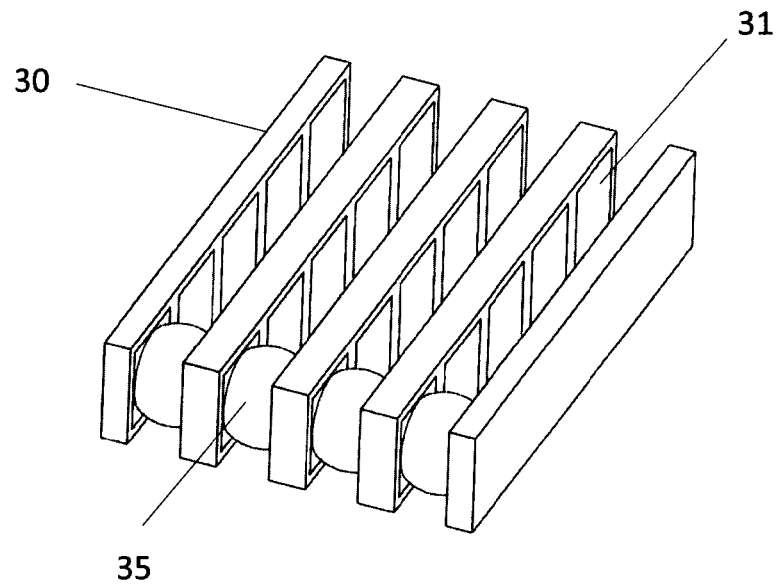
FIGS. 16A and 16B show an example of the segment of the regenerator, when this consists of the parallel plates 30 on which the electrodes 31 are positioned.
Figure 16B:
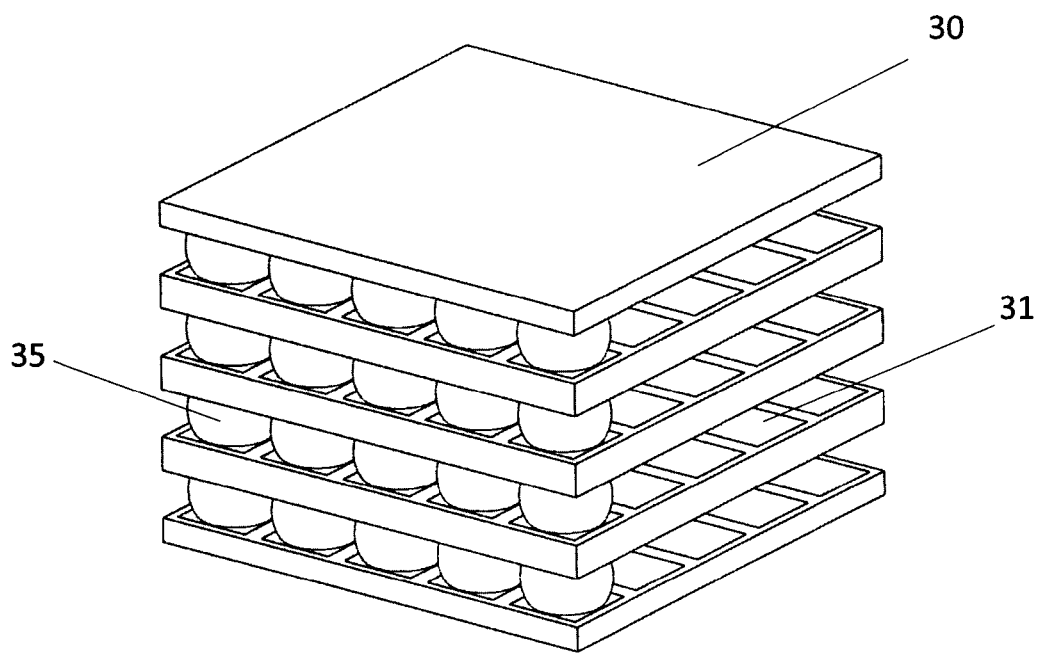

FIG. 16 A shows an example of the parallel plates 30, where the droplets 35 are separated between the plates 30. FIG. 16B shows an example of the parallel plates 30 where the droplets 35 are not separated with the plates 30, but are positioned next to each other with respect to the plane of the plates 30.

Figure 17A:
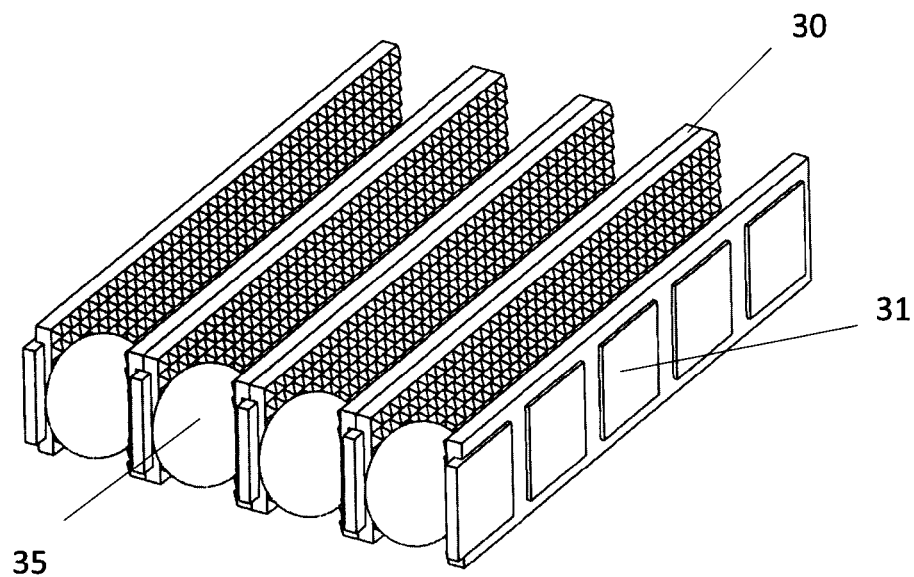
Figure 17B:
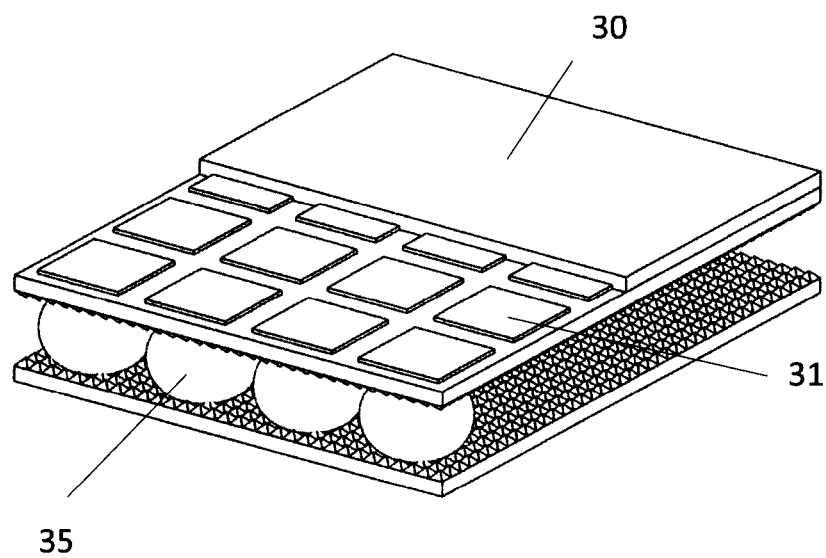
Figure 17C:
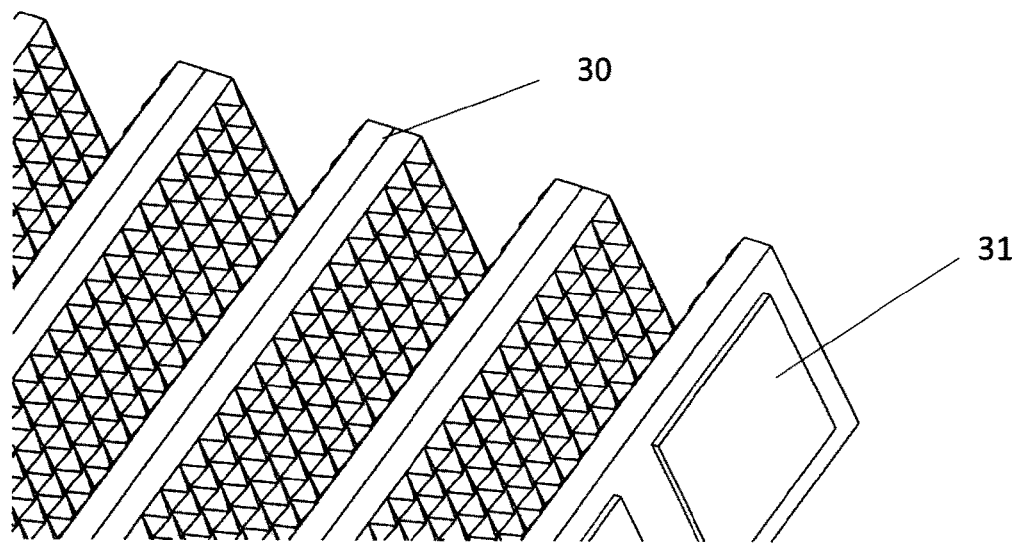

FIGS. 17A to 17C show an example of the segment of the regenerator when it consists of parallel plates of the caloric material with an extended surface, on which the electrodes 31 are positioned. The extended surface serves for better heat transfer between the droplets 35 and the plates 30 of the regenerator 4.

FIG. 17 A shows the case of the parallel plates 30 where the droplets are separated between the plates 30.

FIG. 17 B shows the case of the parallel plates 30, where the droplets 35 are not separated with the parallel plates 30, and are positioned next to each other with respect to the plane of the plates 30.

FIG. 17 C shows a detail of the plates 30 from FIG. 17A, where the surface for the transfer of heat is shown more explicitly.

Figure 18A:
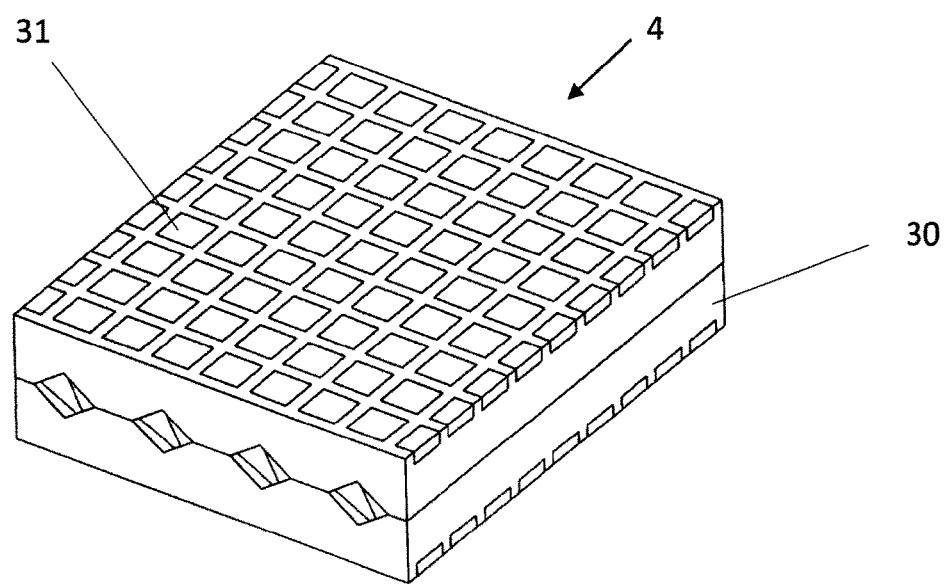
Figure 18B:
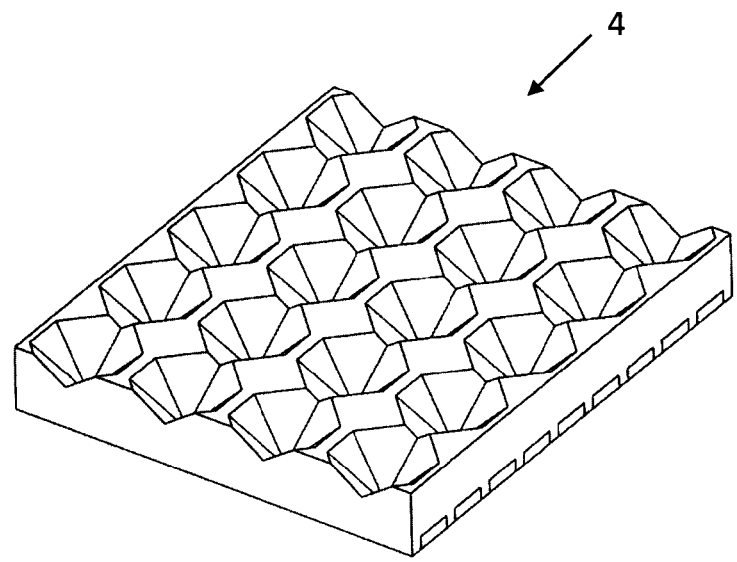

FIGS. 18A and 18B show the first example of the segment of the regenerator 4, consisting of a caloric material with round channels for the primary (first) fluid P (in the form of droplets).

FIG. 18A shows the bottom side of the regenerator 4 on which the electrodes are attached. With the change of the electrical potential the primary (first) fluid P (the principle of electrowetting) is moved through the round channels (FIG. 18B) of the regenerator 4.

FIG. 18B shows the cross-section of the regenerator 4 where the round channels can be seen positioned next to each other. The advantage of such special channels is mainly the increase in the surface for the heat transfer of the regenerator 4 and the primary (first) fluid P.

Figure 19A:
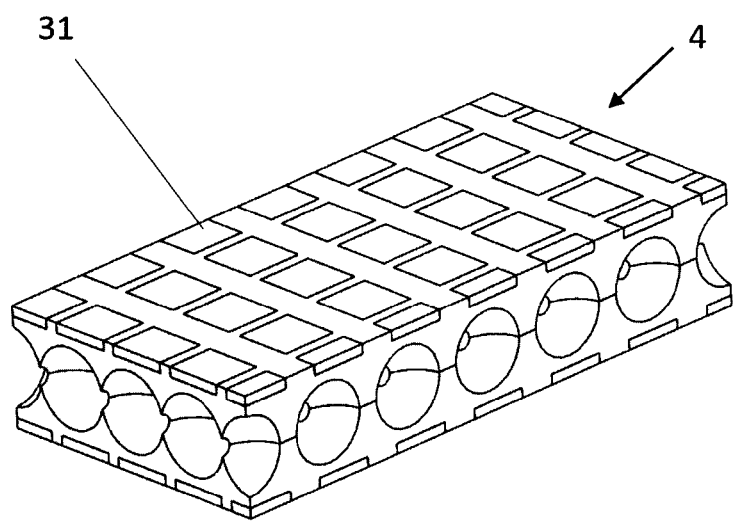
Figure 19B:
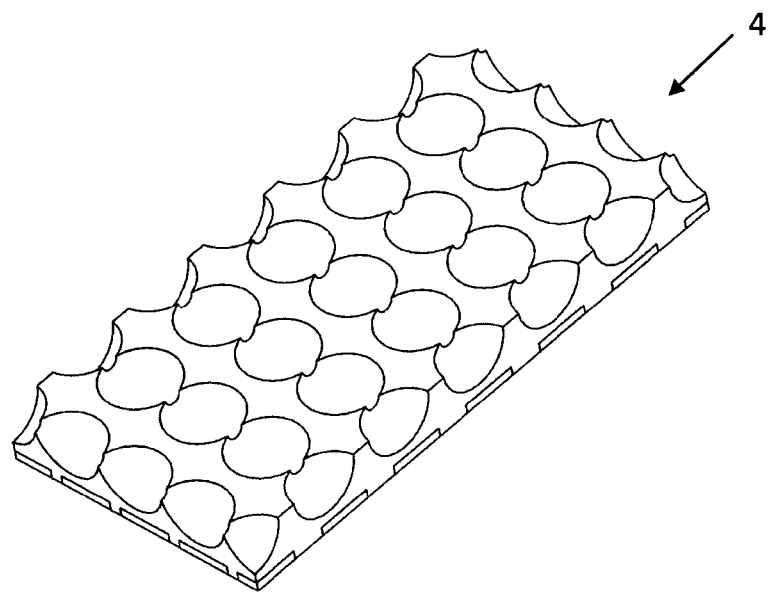

FIG. 19 A shows another example of the segment of the regenerator 4, consisting of a caloric material with the round channel of the primary (first) fluid P (in the form of droplets).

FIG. 19 B shows the bottom side of the regenerator 4, to which the electrodes are attached. With a change of the electrical potential, the primary (first) fluid P (the principle of electrowetting) moves through the round channels of the regenerator 4. The round channels being next to each other, is mainly to provide an increase in the surface for heat transfer between the regenerator 4 and the primary (first) fluid P.

FIGS. 20A to 20H show different possibilities for the segments of the caloric regenerator, consisting of caloric material, where the surface has different forms of channels.

Figure 20A:
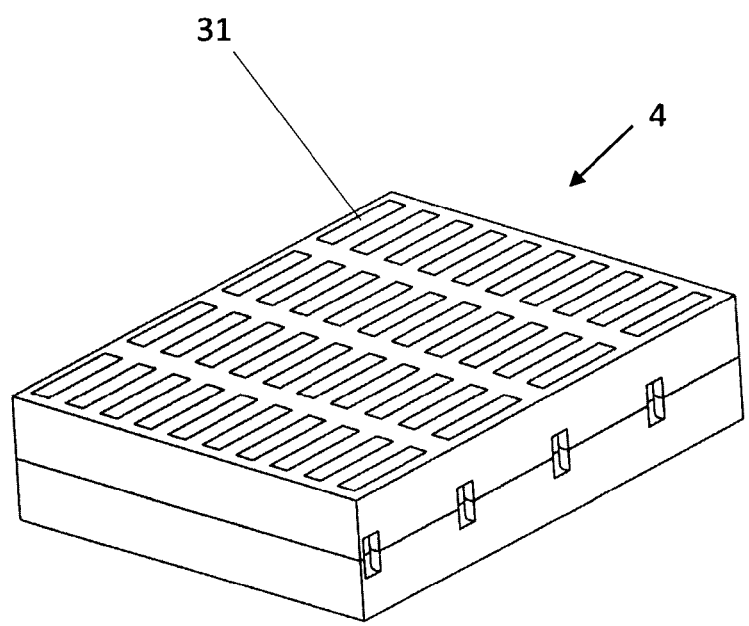
Figure 20B:
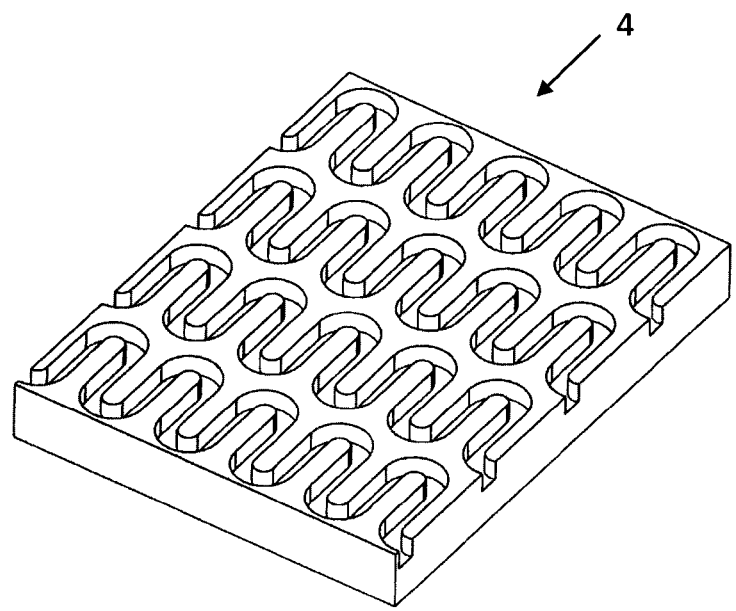
Figure 20C:
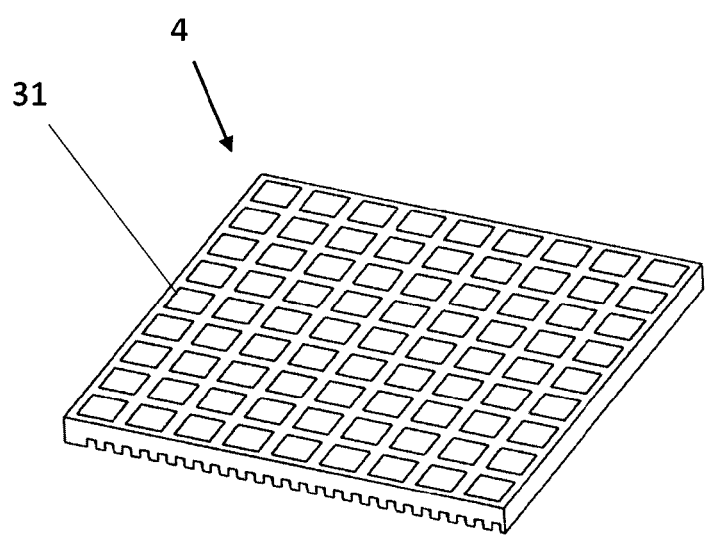
Figure 20D:
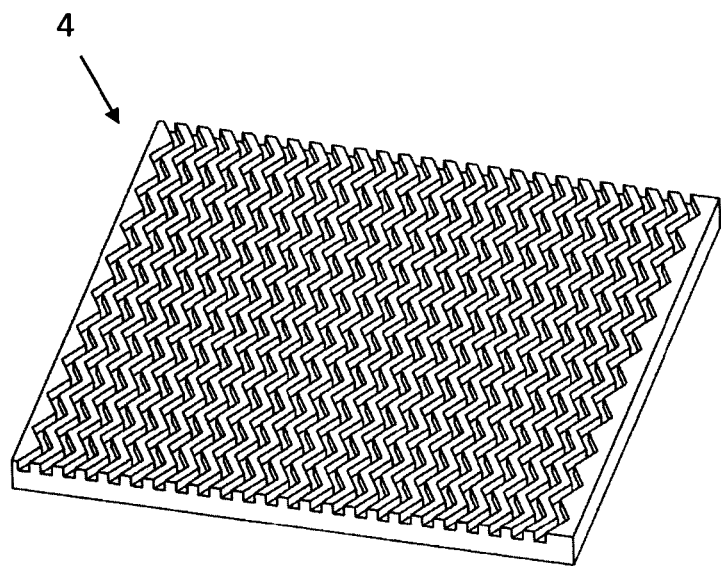
Figure 20E:
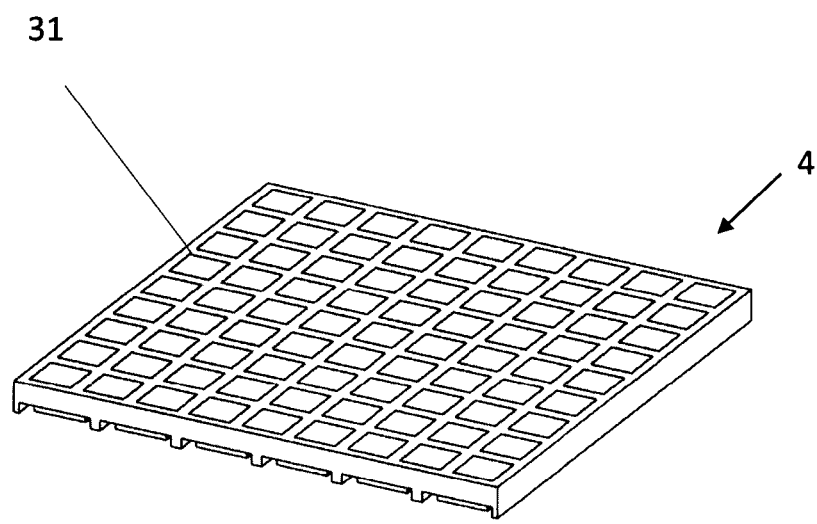
Figure 20F:
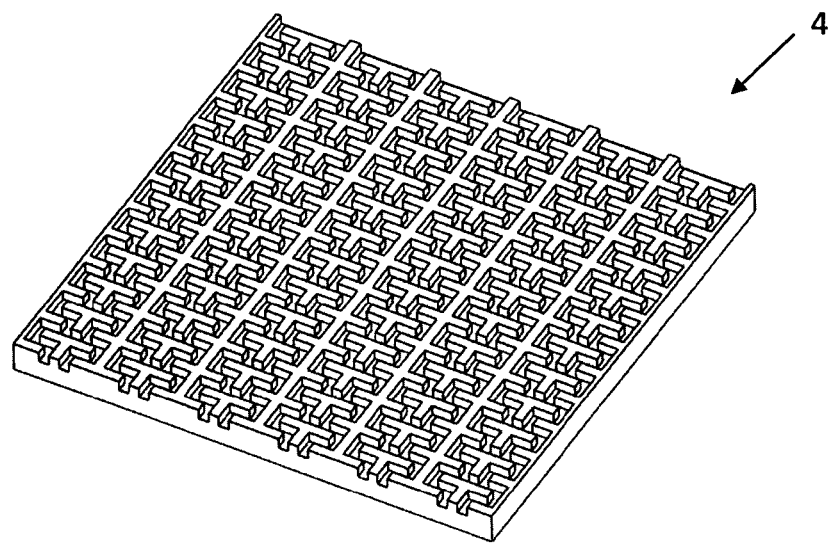
Figure 20G:
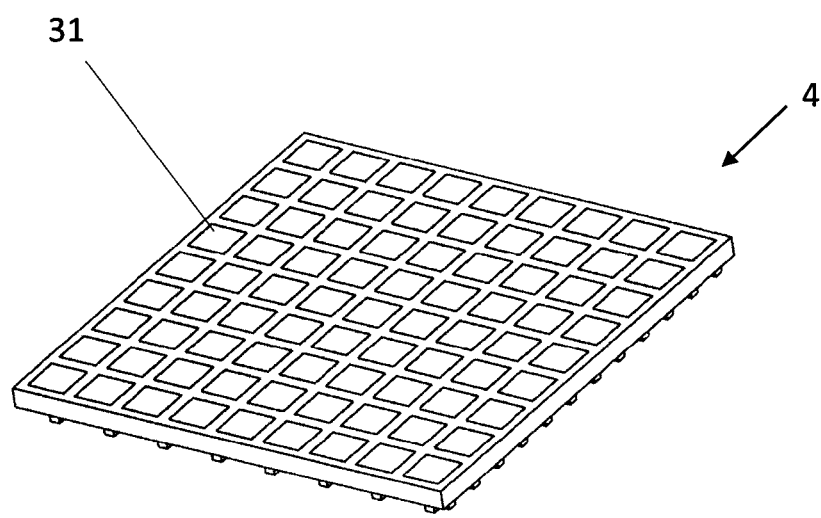
Figure 20H:
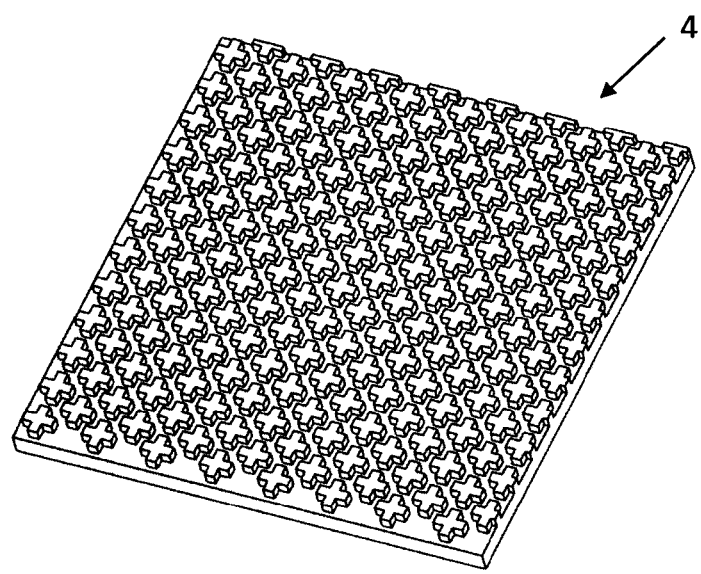

FIG. 20B shows the meandering channels in the regenerator 4, FIG. 20D the zig-zag channels, FIG. 20F the labyrinth channels and FIG. 20H the cross channels. In FIGS. 20E and 20G, the electrodes 31 are shown on the bottom side of the regenerator 4 and they serve for the movement of the droplets of the primary (first) fluid P with the principle of electrowetting. Such curved channels are mainly to ensure elongation of the path of the primary (first) fluid P through the regenerator 4. In comparison with straight channels, this kind of approach leads to a substantially larger heat-transfer surface between the regenerator 4 and the primary (first) fluid P.

Figure 21:
Figure 21:
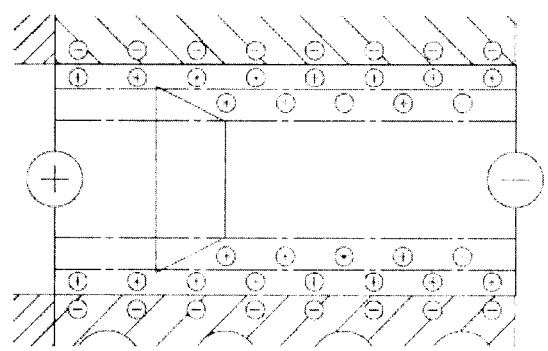
Figure 22:
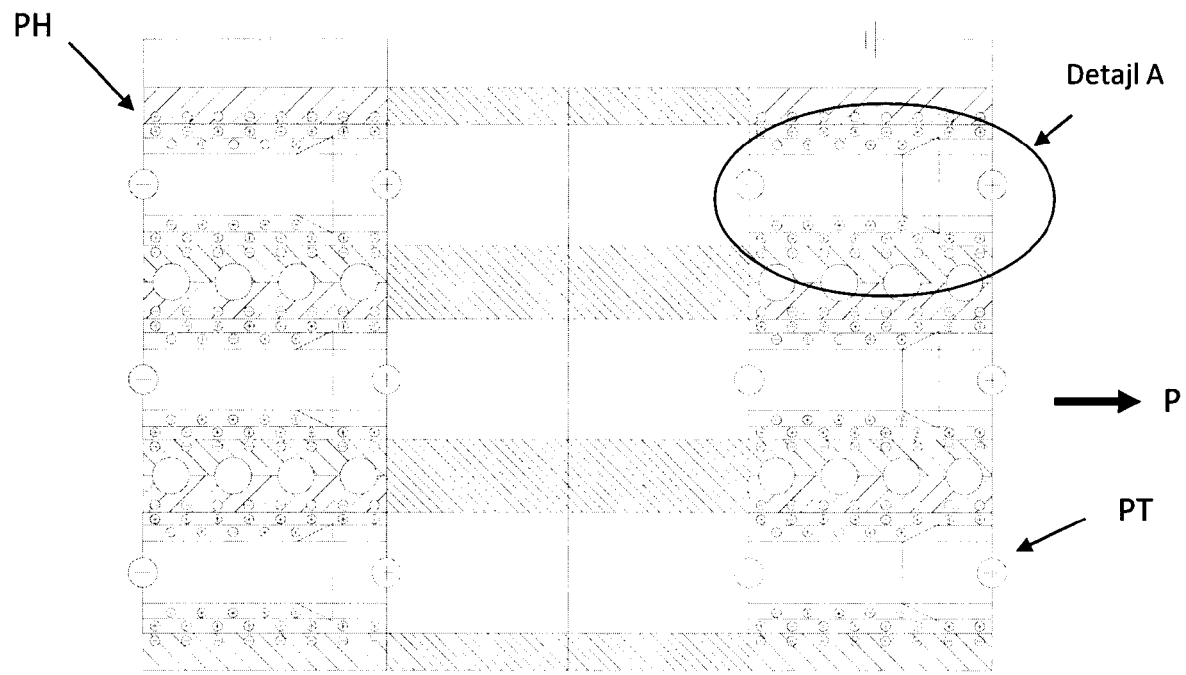
Figure 22:
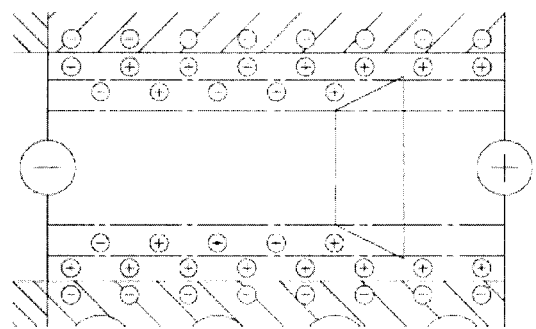

FIGS. 21 and 22 show schematics of the mechanism of the oscillation of the fluid flow of the primary (first) fluid P, which is based on electro-osmosis. From both schematics it is evident that the heat exchangers PT and PH are designed in such a way that the channels for the flow of the primary (first) fluid P are exposed to the changing electrical field (change of the polarity).

FIG. 21 shows the state when the porous structure of the regenerator is exposed to the positive change of the external field or force.

FIG. 22 shows the state when the porous structure of the regenerator is exposed to the negative change of the field or force. When the regenerator is exposed to the positive change of the field or force, it can be seen in the detail of FIG. 21 that the heat exchanger is in the electrical field, which is positive on the left-hand side (cathode) and negative (anode) on the right. The walls of the channel are charged negatively, and for this reason the positive ions (cations) from the electrolytic primary (first) fluid P flows towards such walls of the channel. At the wall a layer forms, which is saturated with positive cations. Because of the high density of the positive cations, the layer of the primary (first) fluid P moves towards the negative anode on the right-hand side of the channel. Because of the viscous forces this layer also drags other layers of the primary (first) fluid P, which is in the channel. In this way the flow of the primary (first) fluid P is formed and flows from the heat exchanger PT through the regenerator 4 (where primary (first) fluid P absorbs heat) into the heat exchanger PH. In the heat exchanger PH the primary (first) fluid P transfers heat to the secondary (second) fluid S.

The process shown in FIG. 22 is the inverse of the above-described process. The regenerator 4 is exposed to the negative change of the field or force (the temperature of the caloric material decreases). In the heat exchangers PT and PH, the polarity is changed, and the electrolytic primary (first) fluid P flows from the heat exchanger PH through the regenerator 4 (where it cools due to heat transfer), and then into the heat exchanger PT, where it absorbs heat from the secondary (second) fluid S.

Figure 23:
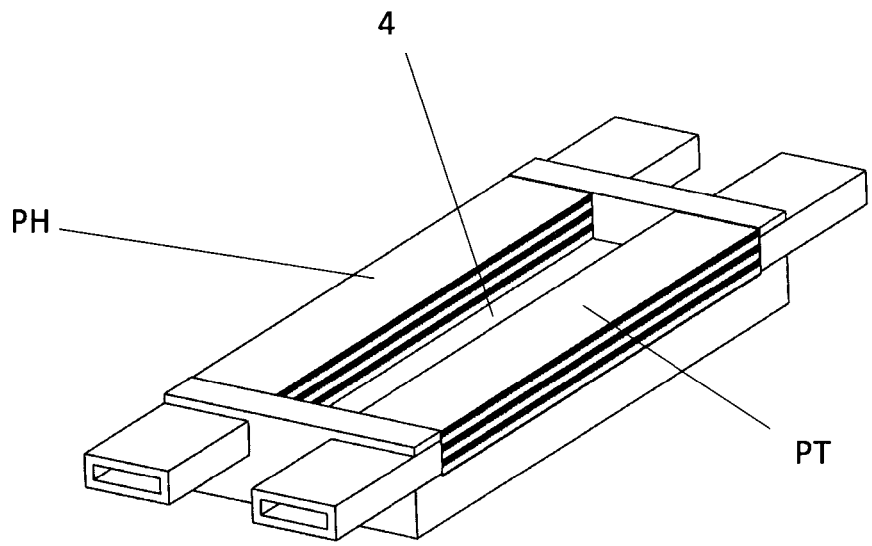

FIG. 23 shows the case of the structure of the heat exchanger PT and the heat exchanger PH, between which the regenerator 4 is positioned.

Figure 24:
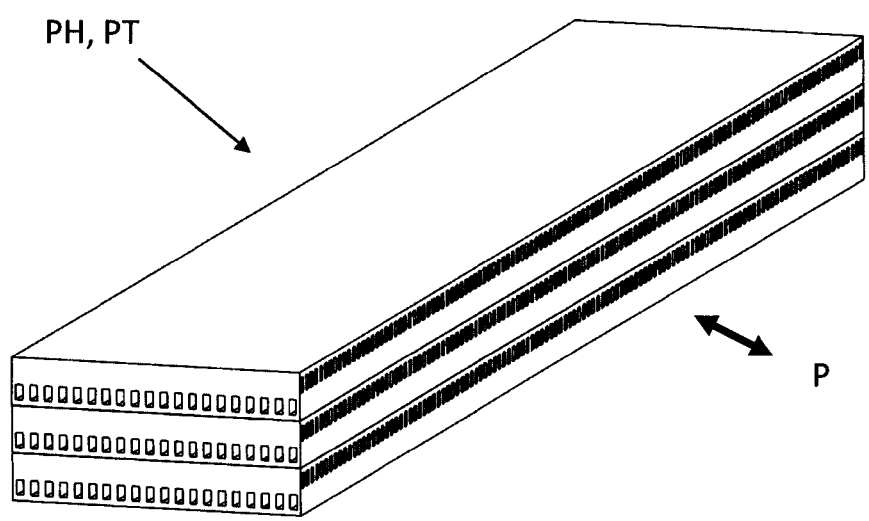

FIG. 24 shows the first example of the structure of the heat exchanger PT or the heat exchanger PH, where the ordered structures for the heat transfer in the channel are applied.

Figure 25A:
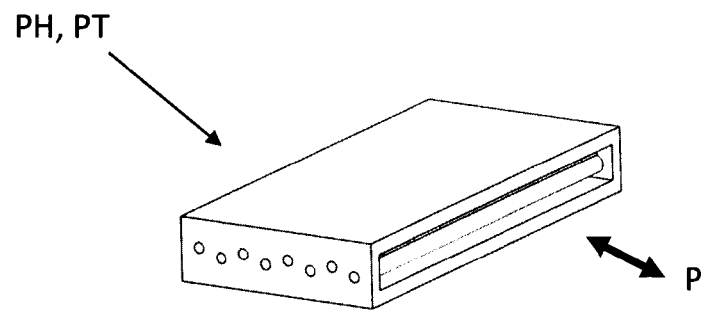
Figure 25B:
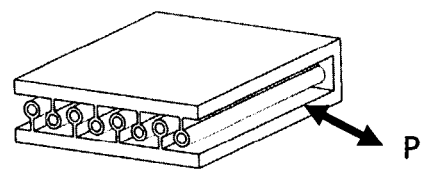

FIGS. 25A and 25B show the second example of the structure of the heat exchanger PT or the heat exchanger PH, where for the fluid flow of the primary (first) fluid P tubes of round or other cross-sections are applied.

Figure 26:
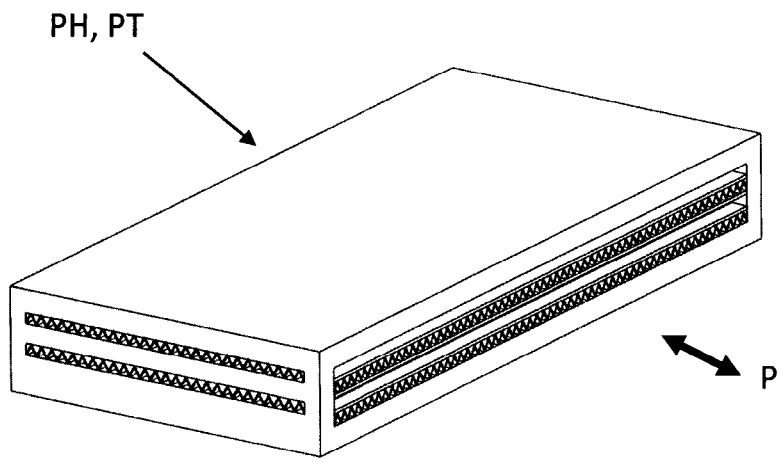

FIG. 26 shows the third example of the structure of the heat exchanger PT or heat exchanger PH, where for the heat transfer in the zig-zag channel or other ordered structures are applied.

In all the cases the surface of the channels for the fluid flow in the heat exchanger PT, and/or the surface of the channels for the fluid flow in the heat exchanger PH, can be extended.

Figure 27:
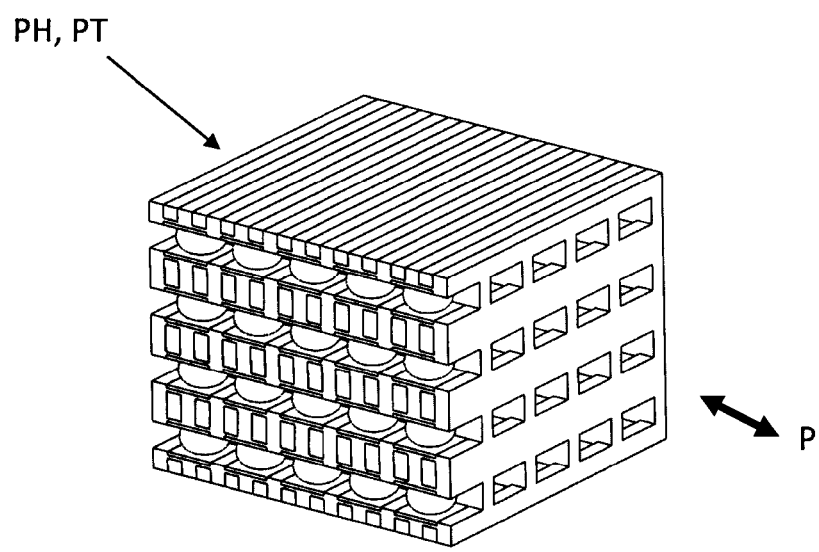

FIG. 27 shows the fourth example of the structure of the heat exchanger PT or heat exchanger PH, where for the movement of the primary (first) fluid P in the form of droplets, the principle of electrowetting is applied. The channels on the side of the primary (first) fluid P consist of electrodes positioned on the walls of these channels. With the change of the electrical potential, the droplets can move to/from the heat exchanger PT or the heat exchanger PH. On the side of the secondary (second) fluid S, the orthogonal channels are shown, through which the secondary (second) fluid S is continuously flowing.

Figure 28:
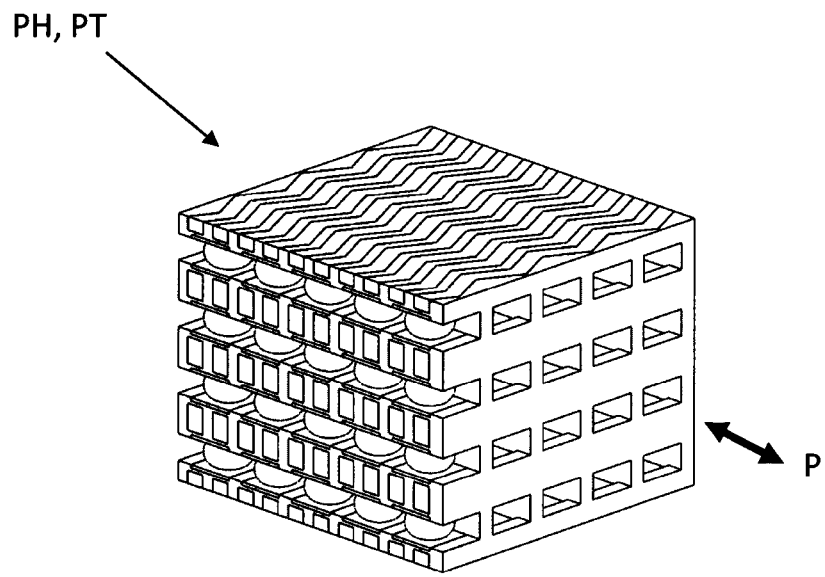

FIG. 28 shows the fifth case of the structure of the heat exchanger PT or heat exchanger PH, where the motion of the primary (first) fluid P is in the form of droplets, where the electrowetting principle is applied. The channels on the side of primary (first) fluid P consist of electrodes, which are positioned on the walls of these channels. With the change of the electrical potential, the droplets move from/to the heat exchanger PT or the heat exchanger PH. On the side of the secondary (second) fluid S, the zig-zag channels are shown, through which the secondary (second) fluid S is continuously flowing.

Figure 29:
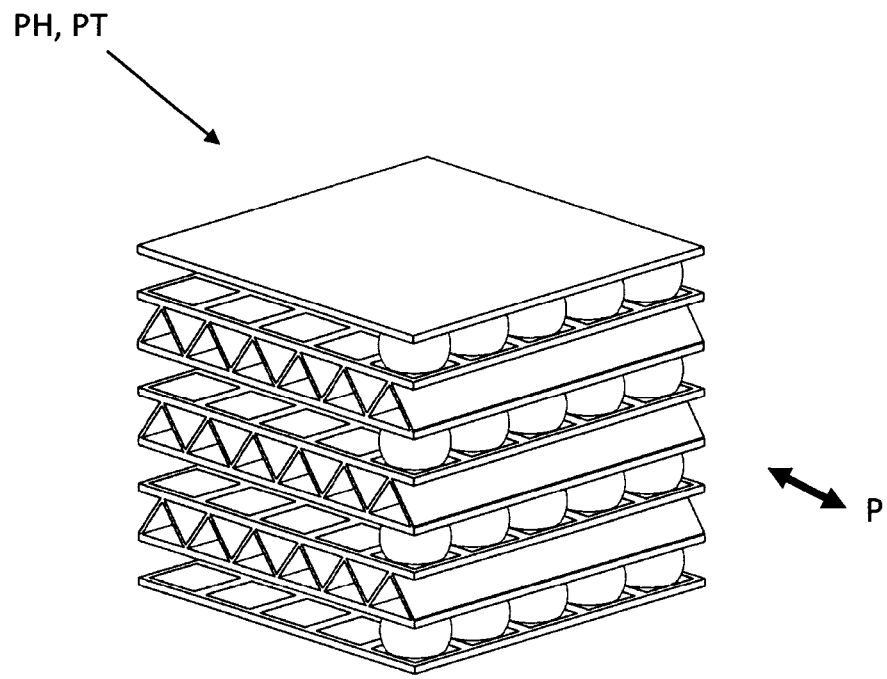

FIG. 29 shows the sixth case of the structure of the heat exchanger PT or heat exchanger PH, where the motion of the primary (first) fluid P is in the form of droplets, where the principle of electrowetting is applied. The channels of the side of the primary (first) fluid P consist of electrodes, which are positioned on their walls. With the change of the electrical potential, the droplets move to/from the heat exchanger PT or heat exchanger PH. On the side of the secondary (second) fluid S triangular channels are shown, through which the secondary (second) fluid S continuously flows.

The method for heat transfer in the embedded structure of heat regenerator 4 and the designs of the related heat regenerators, which operate on the basis of the method by this invention, applies hydraulically separated segments in the regenerator. This disables the fluid flow along the regenerator 4 (the flow along the regenerator 4 is the state of the art). The fluid flow through the hydraulically separated segments of the regenerator 4 is therefore performed perpendicular to the direction of the temperature gradient, which is, in the steady state, established along the regenerator 4. The application of the fluid flow through the hydraulically separated segments does not fulfil the condition for operating at larger temperature spans. This is due to the fact that particular segments in the direction of the fluid flow can be shorter than the whole length of the regenerator 4. Therefore, for the use of the fluid flow of the primary (first) fluid P through the regenerator 4, each side of the regenerator should be attached to two additional heat exchangers. Whereas the primary (first) fluid P oscillates through the regenerator 4 and transfers/absorbs heat to/from both heat exchangers PT and PH, there is required secondary (second) fluid S, which continuously flows between the heat source and the heat sink. If only the heat exchanger PH or PT is observed, then the direction of the secondary (second) fluid S through one heat exchanger PH is counter-directed to the fluid flow of the secondary (second) fluid S through the heat exchanger PT. In this way, despite the fact that the oscillatory flow of the primary (first) fluid flow P is established perpendicularly to the length of the whole regenerator, a temperature distribution and a temperature span can be achieved, similar to the case with the oscillatory flow of the fluid along the whole length of the regenerator, and therefore without separated hydraulic segments. However, in the proposed method a substantially lower drop of the pressure will be established as this is the case in any of the state of the art solutions.

The invention claimed is:

1. A method of heat transfer in an embedded structure of a heat regenerator, the method comprising:
   operating a system that includes:
      a plurality of segments formed from a porous regenerative material, where the segments are hydraulically separated, and where a temperature gradient through a particularly hydraulically separated segment is smaller than the temperature gradient established along the embedded structure of the heat regenerator;
      a structure for flow of the primary fluid that oscillates through each of the hydraulically separated segments, consisting of porous regenerative material, with the oscillation in a direction that is approximately perpendicular to a direction of the temperature gradient, which is established along the embedded structure of the heat regenerator, whereas the primary fluid transfers or absorbs heat flux from a first and a second heat exchanger,
      a first heat exchanger, which is hydraulically connected with a first side of hydraulically separated segments, the hydraulically separated segments formed from the porous regenerative material;
      a second heat exchanger, which is hydraulically connected with a second side of the hydraulically separated segments, the hydraulically separated segments formed from the porous regenerative material;
      a third heat exchanger that represents the connection with a heat source;
      a fourth heat exchanger that represents the connection with a heat sink; and
      a secondary fluid that flows through the third heat exchanger, the first heat exchanger, the fourth heat exchanger, and the second heat exchanger.

2. A heat regenerator that enables the method of claim 1 to be performed, the heat regenerator comprising:
   a porous structure of the regenerator, consisting of hydraulically separate segments that are formed from a porous regenerative material, the hydraulically separate segments configured to disable a longitudinal flow of the primary fluid, which is a working fluid in the regenerator;
   a primary hot heat exchanger, which enables heat transfer from a oscillatory flow of the primary fluid to a unidirectional flow of the secondary fluid on a hot side of the porous structure of regenerator;

a primary cold heat exchanger, which enables heat transfer from the unidirectional flow of the secondary fluid to the oscillatory flow of the primary fluid on a cold side of the porous structure of the regenerator;

a secondary cold heat exchanger, which is positioned on the side of the heat source and serves for the transfer of heat into the secondary fluid;

a secondary hot heat exchanger, which is positioned on the side of the heat sink and serves for a heat absorption from the secondary fluid;

the secondary fluid, which connects the heat source and the heat sink through the heat exchangers and;

a flow of the secondary fluid through the primary hot heat exchanger, which is counter-directed to the flow of the secondary fluid in the primary cold heat exchanger;

a system for pumping the secondary fluid; and a system for the oscillation of the primary fluid.

3. The heat regenerator of claim 2, wherein the porous regenerative material of the regenerator in hydraulically separated segments is a caloric (magnetocaloric, barocaloric, elastocaloric, electrocaloric, or multicaloric) material.

4. The heat regenerator of claim 3, wherein the porous regenerative material is a combination of at least two materials of the group of claim 3.

5. A heat regenerator of claim 4, wherein the heat regenerator is one of a caloric refrigerator, a caloric heat pump, a caloric power generator, an absorption refrigerator, an absorption heat pump, an absorption drying device, a mechanical Stirling refrigerator, a mechanical Stirling heat pump, a mechanical Stirling power generator, a thermoacoustic refrigerator, a thermoacoustic heat pump, a thermoacoustic power generator, a pulsed tube refrigerator, a Gifford-McMahon cycle, a furnace or boiler, a catalytic converter and a chemical reactor.

6. The heat regenerator of claim 2, wherein the porous regenerative material of the regenerator in hydraulically separated segments is a caloric (magnetocaloric, barocaloric, elastocaloric, electrocaloric, or multicaloric) material, combined with at least one other material chosen from a group of metals consisting of:

ceramics, glasses, composites of carbon or of carbon materials, polymers or composites of polymer materials, metamaterials, and liquid crystals.

7. The heat regenerator of claim 6, wherein the heat regenerator is one of a caloric refrigerator, a caloric heat pump and a caloric power generator.

8. The heat regenerator of claim 2, wherein:

the porous regenerative material in the regenerator in the hydraulically separated segment is not caloric, and the porous regenerative material is selected from a group of desiccant materials consisting of:

activated alumina, aerogel, benzophenone, bentonite, calcium chloride, calcium oxide, calcium sulphate, cobalt chloride, copper sulphate, lithium chloride, lithium bromide, magnesium sulphate, magnesium perchlorate, molecular sieve, potassium carbonate, potassium hydroxide, silica gel, sodium, sodium chlorate, sodium chloride, sodium hydroxide, sodium sulphate, and sucrose.

9. The heat regenerator of claim 8, wherein the heat regenerator is one of an absorption refrigerator, an absorption heat pump, and an absorption drying device.

10. The heat regenerator of claim 2, wherein:

the porous regenerative material in the regenerator in the hydraulically separated segment is not caloric, and the porous regenerative material is one ore more materials selected from a group of materials consisting of:

metals, ceramics, glasses, composites of carbon or of carbon materials, polymers or composites of polymer materials, cement, concrete, rock, and metamaterials.

11. The heat regenerator of claim 10, wherein heat regenerator, is one of a mechanical Stirling refrigerator, a mechanical Stirling heat pump, a mechanical Stirling power generator, a thermoacoustic refrigerator, a thermoacoustic heat pump, a thermoacoustic power generator, a pulsed tube refrigerator, a Gifford-McMahon cycle, a furnace or boiler, a catalytic converter and a chemical reactor.

12. The heat regenerator of claim 2, wherein a number of hydraulically separated segments is lower than 10,000.

13. The heat regenerator of claim 2, wherein the primary fluid is chosen from the group consisting of liquids, liquid metals, gases, and refrigerants.

14. The heat regenerator of claim 2, wherein the secondary fluid is chosen from the group consisting of liquids, liquid metals, gases and refrigerants.

15. The heat regenerator of claim 2, wherein a mechanism, device, or physical phenomena that enables the flow of the primary fluid, is based on mechanical actuation, capillary effect, electro-kinetics, electro-hydrodynamics, magneto-hydrodynamics, electrowetting or magneto wetting or a principle of a heat pipe.

16. The heat regenerator of claim 2, wherein a mechanism, device, or a physical phenomenon that enables the flow of the secondary fluid, is based on a mechanical actuation, capillary effect, electro-kinetics, electro-hydrodynamics, magneto-hydrodynamics, electrowetting or magneto wetting, a principle of a heat pipe or a vapour-compression process.

17. The heat regenerator of claim 2, wherein the primary hot heat exchanger, primary cold heat exchanger, secondary hot heat exchanger and the secondary cold heat exchanger are formed from materials chosen from the group consisting of metals, polymers, carbon or carbon materials, such are carbon, graphite, graphene, composite materials, ceramic materials, cement, concrete and rocks or rock materials or combinations thereof.

* * * * *